United States Patent
Oh et al.

(10) Patent No.: US 12,034,979 B2
(45) Date of Patent: Jul. 9, 2024

(54) POINT CLOUD DATA TRANSMISSION DEVICE, POINT CLOUD DATA TRANSMISSION METHOD, POINT CLOUD DATA RECEPTION DEVICE AND POINT CLOUD DATA RECEPTION METHOD

(71) Applicant: LG ELECTRONICS INC., Seoul (KR)

(72) Inventors: Hyunmook Oh, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 354 days.

(21) Appl. No.: 17/605,972

(22) PCT Filed: Mar. 20, 2020

(86) PCT No.: PCT/KR2020/003869
§ 371 (c)(1),
(2) Date: Oct. 22, 2021

(87) PCT Pub. No.: WO2020/190090
PCT Pub. Date: Sep. 24, 2020

(65) Prior Publication Data
US 2022/0286713 A1 Sep. 8, 2022

(30) Foreign Application Priority Data
Mar. 20, 2019 (KR) .................. 10-2019-0031846

(51) Int. Cl.
*H04N 19/96* (2014.01)
*H04N 19/124* (2014.01)
(Continued)

(52) U.S. Cl.
CPC ........... *H04N 19/96* (2014.11); *H04N 19/124* (2014.11); *H04N 19/593* (2014.11); *H04N 19/597* (2014.11); *H04N 19/91* (2014.11)

(58) Field of Classification Search
CPC ...... H04N 19/96; H04N 19/597; H04N 19/70; H04N 19/91; H04N 19/105; H04N 19/124;
(Continued)

(56) References Cited

U.S. PATENT DOCUMENTS

2017/0347120 A1* 11/2017 Chou ................. H04N 19/89
2018/0012400 A1    1/2018 Evans
(Continued)

FOREIGN PATENT DOCUMENTS

KR    1020180087348 A    8/2018

OTHER PUBLICATIONS

Ke Zhang et al., "Hierarchical Segmentation Based Point Cloud Attribute Compression", 2018 IEEE International Conference on Acoustics, Speech and Signal Processing(ICASSP), Apr. 15, 2018.
(Continued)

*Primary Examiner* — Nathnael Aynalem
(74) *Attorney, Agent, or Firm* — Bryan Cave Leighton Paisner LLP

(57) ABSTRACT

A point cloud data transmission method according to embodiments can comprise the steps of: acquiring point cloud data; encoding geometry information included in the point cloud data; encoding attribute information included in the point cloud data; and transmitting the encoded geometry information and the encoded attribute information.

6 Claims, 31 Drawing Sheets

(51) Int. Cl.
*H04N 19/593* (2014.01)
*H04N 19/597* (2014.01)
*H04N 19/91* (2014.01)

(58) Field of Classification Search
CPC .... H04N 19/13; H04N 19/136; H04N 19/167; H04N 19/119; H04N 19/42; H04N 19/423; H04N 19/593; H04N 19/103; H04N 19/107; H04N 19/11; H04N 19/169; H04N 19/17; H04N 19/172; H04N 19/1883; H04N 19/30; H04N 19/46; H04N 19/513; H04N 19/52; H04N 19/527; H04N 19/60; G06T 9/40; G06T 9/001; G06T 9/00; G06T 17/00; G06T 2210/56; G06T 9/005; G06T 15/005; G06T 15/08; G06T 15/10; G06T 15/20; G06T 17/005; G06T 2207/10028; G06T 7/593; G06T 9/004; G06T 17/05; G06T 7/11; G06T 1/20

USPC ........................ 375/240.01–240.29
See application file for complete search history.

(56) References Cited

U.S. PATENT DOCUMENTS

| | | |
|---|---|---|
| 2019/0080483 A1 | 3/2019 | Mammou et al. |
| 2019/0081638 A1* | 3/2019 | Mammou ............ H04N 19/436 |
| 2020/0302651 A1* | 9/2020 | Flynn .................... G06T 3/4084 |
| 2020/0374566 A1* | 11/2020 | Sugio .................. H04N 19/107 |
| 2021/0144403 A1* | 5/2021 | Lasserre ................ G06T 9/001 |

OTHER PUBLICATIONS

3DG, "G-PCC codec description v2", International Organisation for Standardisation Organisation Internationale De Normalisation ISO/IEC JTC1/SC29/WG11 Coding of Moving Pictures and Audio, ISO/IEC JTC1/SC29/WG11 N18189, Jan. 2019.

* cited by examiner

FIG. 6
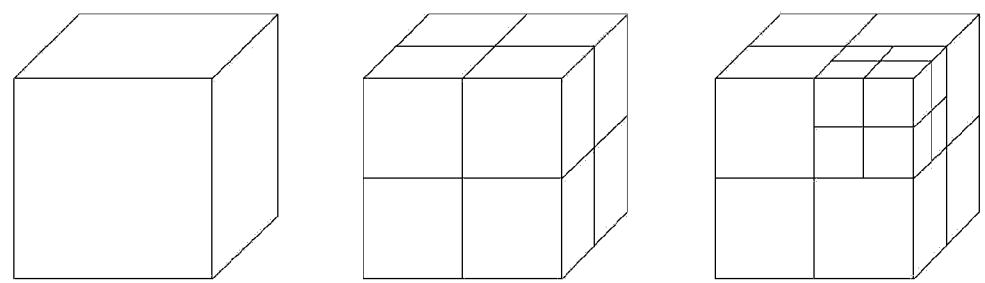
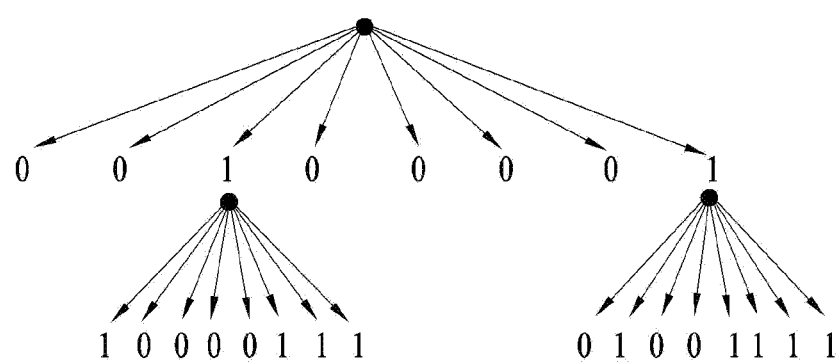

FIG. 7
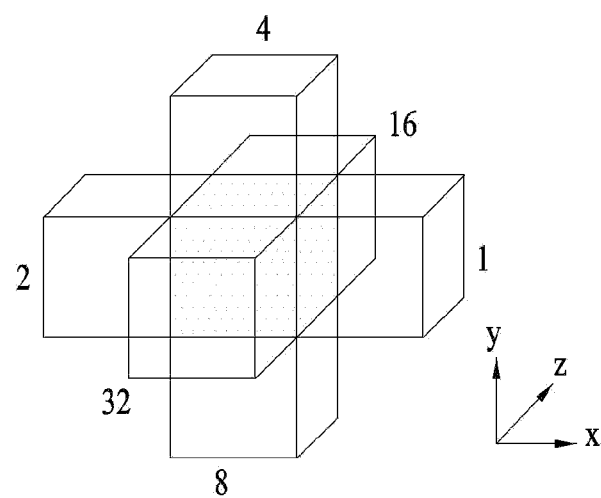
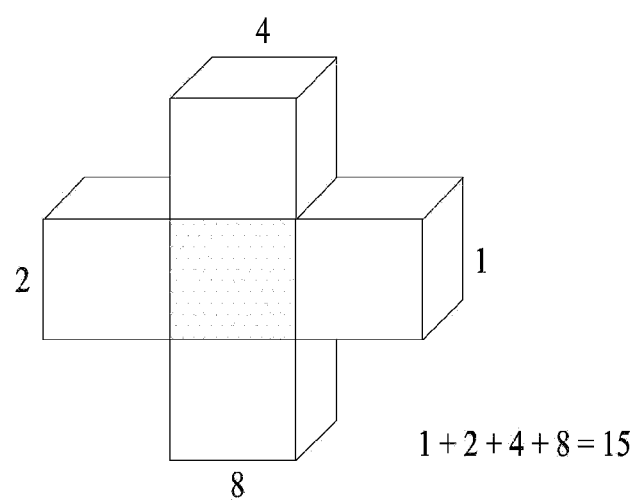
1 + 2 + 4 + 8 = 15

FIG. 27

| attribute_parameter_set( ) { | Descriptor |
|---|---|
| aps_attr_parameter_set_id | ue(v) |
| aps_seq_parameter_set_id | ue(v) |
| attr_coding_type | ue(v) |
| .... | |
| if( attr_coding_type == 3 ) { | |
| pred_node_size_log2_minus1 | u(8) |
| pred_type | u(8) |
| recon_type | u(8) |
| quant_step_size_pred | u(8) |
| quant_step_size_res | u(8) |
| quant_step_chroma_pred | u(8) |
| quant_step_chroma_res | u(8) |
| transform_type | u(8) |
| } | |
| aps_extension_present_flag | u(1) |
| if( aps_extension_present_flag ) | |
| while( more_data_in_byte_stream( ) ) | |
| aps_extension_data_flag | u(1) |
| byte_alignment( ) | |
| } | |

FIG. 28

| general_attribute_bitstream( ) { | Descriptor |
|---|---|
|     attribute_slice_header( ) | |
|     attribute_slice_data( ) | |
| } | |

FIG. 29

| attribute_slice_header( ) { | Descriptor |
|---|---|
| abh_attr_parameter_set_id | ue(v) |
| abh_attr_sps_attr_idx | ue(v) |
| byte_alignment( ) | |
| } | |

FIG. 30

| attribute_slice_data( ) { | Descriptor |
|---|---|
|    dimension = attribute_dimension[ abh_attr_sps_attr_idx ] | |
|    if( attr_coding_type = = 0 ) | |
|       PredictingWeight_Lifting_bitstream( dimension ) | |
|    else if( attr_coding_type = = 1 ) | |
|       RAHT_bitstream( dimension ) | |
|    else if( attr_coding_type = = 2 ) | |
|       FixedWeight_Lifting_bitstream( dimension ) | |
|    else if( attr_coding_type == 3) | |
|       GeometricAttributeCoding_bitstream( dimension ) | |
|    byte_alignment( ) | |
| } | |

FIG. 31

| GeometricAttributeCoding_bitstream ( dimension ) { | Descriptor |
|---|---|
| for( i = 0; i < pointCount; i++ ) { | |
| for( k = 0; k < dimension ; k++ ) | |
| value_res[ k ][ i ] | ae(v) |
| } | |
| for( i=0; i < PredCount; i++) { | |
| for( k = 0; k < dimension ; k++ ) | |
| value_pred[ k ][ i ] | ae(v) |
| } | |
| } | |

POINT CLOUD DATA TRANSMISSION DEVICE, POINT CLOUD DATA TRANSMISSION METHOD, POINT CLOUD DATA RECEPTION DEVICE AND POINT CLOUD DATA RECEPTION METHOD

This application is a National Stage Application of International Application No. PCT/KR2020/003869, filed on Mar. 20, 2020, which claims priority to Korean Application No. No. 10-2019-0031846, filed on Mar. 20, 2019, which are hereby incorporated by reference in their entirety for all purposes as if fully set forth herein.

TECHNICAL FIELD

The present disclosure provides a method for providing point cloud contents to provide a user with various services such as virtual reality (VR), augmented reality (AR), mixed reality (MR), and autonomous driving services.

BACKGROUND ART

A point cloud is a set of points in a three-dimensional (3D) space. It is difficult to generate point cloud data because the number of points in the 3D space is large.

A large throughput is required to transmit and receive point cloud data. Therefore, the operation of encoding for compression/decompression, which is performed in the process of transmitting and receiving the point cloud data, is complicated and time-consuming due to the large volume of the point cloud data.

DISCLOSURE

Technical Problem

An object of the present disclosure devised to solve the above-described problems is to provide a point cloud data transmission device, a point cloud data transmission method, a point cloud data reception device, and a point cloud data reception method for efficiently transmitting and receiving a point cloud.

Another object of the present disclosure is to provide a point cloud data transmission device, a point cloud data transmission method, a point cloud data reception device, and a point cloud data reception method for addressing latency and encoding/decoding complexity.

Another object according to the embodiments is to provide a point cloud data transmission device, a point cloud data transmission method, a point cloud data reception device, and a point cloud data reception method that may improve the point cloud compression performance by improving encoding of attributes of geometry-point cloud compression (G-PCC).

Another object according to the embodiments is to provide a point cloud data transmission device, a point cloud data transmission method, a point cloud data reception device, and a point cloud data reception method that may resolve latency and encoding/decoding complexity by encoding and decoding attribute information using similarity between attributes structurally adjacent on the geometry of point cloud data for attribute prediction.

Objects of the present disclosure are not limited to the aforementioned objects, and other objects of the present disclosure which are not mentioned above will become apparent to those having ordinary skill in the art upon examination of the following description.

Technical Solution

To achieve these objects and other advantages and in accordance with embodiments, a method for transmitting point cloud data may include acquiring point cloud data, encoding geometry information included in the point cloud data, encoding attribute information included in the point cloud data, and transmitting the encoded geometry information and the encoded attribute information.

In an embodiment, the encoding of the geometry information may include quantizing the geometry information, generating an octree having an octal tree structure based on the quantized geometry information, wherein the octree includes at least a root node corresponding to a highest layer and a leaf node corresponding to a lowest layer, approximating a structure of the octree, reconstructing geometry information based on the generated octree and the approximated octree, and entropy-encoding an occupancy code of each node of the generated octree or the approximated octree and outputting a geometry bitstream.

In an embodiment, the encoding of the attribute information may include reconstructing the attribute information by mapping the reconstructed geometry information and the attribute information, detecting neighbor nodes of a node to be encoded from the generated octree or the approximated octree, predicting attribute information of the node to be encoded based on attribute information mapped to the detected neighbor nodes, estimating residual attribute information based on the predicted attribute information and the attribute information of the node to be encoded, and entropy-encoding the predicted attribute information and the residual attribute information and transmitting an attribute bitstream.

In an embodiment, the encoding of the attribute information further may include quantizing the predicted attribute information and the residual attribute information based on a quantization coefficient.

In an embodiment, a node to be encoded in the leaf node of the octree may be one of eight child nodes split from the same parent node, wherein the detecting of the neighbor nodes may include detecting the remaining seven child nodes excluding the node as neighbor nodes of the node.

In an embodiment, the predicting of the attribute information may include independently predicting the attribute information for each node of the leaf node of the octree.

In an embodiment, the predicting of the attribute information may include assigning same predicted attribute information to nodes belonging to a neighbor of the leaf node of the octree.

In an embodiment, the predicting of the attribute information may include determining the predicted attribute information of nodes belonging to a neighbor of the leaf node of the octree as one of a representative value, an average value, or a median value of the attribute information of the nodes belonging to the neighbor of the leaf node of the octree.

In another aspect of the present disclosure, an apparatus for transmitting point cloud data may include an acquirer configured to acquire point cloud data, a geometry encoder configured to encode geometry information included in the point cloud data, an attribute encoder configured to encode attribute information included in the point cloud data, and a transmitter configured to transmit the encoded geometry information and the encoded attribute information.

In an embodiment, the geometry encoder may include a quantizer configured to quantize the geometry information, an octree analyzer configured to generate an octree having an octal tree structure based on the quantized geometry information, wherein the octree includes at least a root node corresponding to a highest layer and a leaf node corresponding to a lowest layer, an approximation analyzer configured to approximate a structure of the octree, a geometry reconstructor configured to reconstruct geometry information based on the generated octree and the approximated octree, and an arithmetic encoder configured to entropy-encode an occupancy code of each node of the generated octree or the approximated octree and output a geometry bitstream.

In an embodiment, the attribute encoder may include an attribute transformer configured to reconstruct the attribute information by mapping the reconstructed geometry information and the attribute information, a neighbor node detector configured to detect neighbor nodes of a node to be encoded from the generated octree or the approximated octree, an attribute predictor configured to predict attribute information of the node to be encoded based on attribute information mapped to the detected neighbor nodes, a residual attribute estimator configured to estimate residual attribute information based on the predicted attribute information and the attribute information of the node to be encoded, and an arithmetic encoder configured to entropy-encode the predicted attribute information and the residual attribute information and transmit an attribute bitstream.

In an embodiment, the attribute encoder further may include a coefficient quantizer configured to quantize the predicted attribute information and the residual attribute information based on a quantization coefficient.

In an embodiment, a node to be encoded in the leaf node of the octree may be one of eight child nodes split from the same parent node, wherein the neighbor node detector may detect the remaining seven child nodes excluding the node as neighbor nodes of the node.

In an embodiment, the attribute information predictor may independently predict the attribute information for each node of the leaf node of the octree.

In an embodiment, the attribute information predictor may assign same predicted attribute information to nodes belonging to a neighbor of the leaf node of the octree.

In an embodiment, the attribute information predictor determines the predicted attribute information of nodes belonging to a neighbor of the leaf node of the octree as one of a representative value, an average value, or a median value of the attribute information of the nodes belonging to the neighbor of the leaf node of the octree.

In another aspect of the present disclosure, a method for receiving point cloud data may include receiving point cloud data and signaling information, decoding geometry information included in the point cloud data, decoding attribute information included in the point cloud data, and processing and rendering the decoded geometry information and the decoded attribute information.

In an embodiment, the decoding of the geometry information may include regenerating an octree based on an occupancy code included in the geometry information.

In an embodiment, the decoding of the attribute information may include detecting neighbor nodes based on a structure of the octree regenerated in the decoding of the geometry information, outputting predicted attribute information based on the detected neighbor nodes, and reconstructing attribute information based on the predicted attribute information and residual attribute information included in the received attribute information.

In another aspect of the present disclosure, an apparatus for receiving point cloud data may include a receiver configured to receive point cloud data and signaling information, a geometry decoder configured to decode geometry information included in the point cloud data, an attribute decoder configured to decode attribute information included in the point cloud data, and a renderer configured to process and render the decoded geometry information and the decoded attribute information.

In an embodiment, the geometry decoder may include an octree synthesizer configured to regenerate an octree based on an occupancy code included in the geometry information.

In an embodiment, the attribute decoder may include a neighbor node detector configured to detect neighbor nodes based on a structure of the octree regenerated in the decoding of the geometry information, an attribute predictor configured to output predicted attribute information based on the detected neighbor nodes, and an attribute reconstructor configured to reconstruct attribute information based on the predicted attribute information and residual attribute information included in the received attribute information.

Advantageous Effects

A point cloud data transmission method, a point cloud transmission device, a point cloud data reception method, and a point cloud reception device according to embodiments may provide a good-quality point cloud service.

The point cloud data transmission method, the transmission device, the point cloud data reception method, and the reception device according to the embodiments may achieve various video codec schemes.

The point cloud data transmission method, the transmission device, the point cloud data reception method, and the reception device according to the embodiments may provide universal point cloud content such as a self-driving service.

The point cloud data transmission method, the transmission device, the point cloud data reception method, and the reception device according to the embodiments may use similarity between attributes structurally adjacent on geometry for attribute prediction to compress the attributes through the point cloud transmission device and decompress the attributes of the point cloud through the reception device. Thereby, the similarity between the highly related attributes in the geometry structure for a predicted attribute may be effectively removed. In particular, compared to attribute compression using RAHT transform or LOD/Lifting transform, computational complexity and dependence on geometry decoding may be reduced, thereby increasing the decoding speed.

In particular, when the point cloud data is compressed based on the present disclosure, the transmitting side may compress attribute information based on a smaller amount of computation, and the information is highly likely to be utilized in a transmission system requiring low-delay. In addition, compressing the attribute information for decoders of various capacities may support receivers of various capacities through one bitstream instead of generating or storing independent compressed information suitable for each decoder capacity, and therefore may have advantages in terms of storage space and bit efficiency at the transmitting side.

Further, when the point cloud data is received based on the present disclosure, the attribute information may be reconstructed at the receiving side while performing geometry decoding with a smaller amount of computation, and may therefore be usable for a transmission/reception system requiring low-delay. In addition, when the output level of the attribute information is selected, even a receiver having low computational power may output attribute information suitable for the capacity of the receiver without delay. For example, in the process of attribute decoding and reconstruction, different results may be output depending on the capacity of the receiver or system requirements. In this case, the decoded or reconstructed attribute of each level may be used as an attribute value matching the octree node of the level.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 6 illustrates an example of octree and occupancy code according to embodiments.

FIG. 7 illustrates an example of a neighbor node pattern according to embodiments.

FIG. 27 shows an exemplary syntax structure of an attribute parameter set (attribute_paramter_set( )) according to embodiments.

FIG. 28 shows an exemplary syntax structure of a general attribute bitstream (general_attribute_bitstream( )) according to embodiments.

FIG. 29 shows an exemplary syntax structure of an attribute slice header (attribute_slice_header( )) according to embodiments.

FIG. 30 shows an exemplary syntax structure of attribute slice data (attribute_slice_data( )) according to embodiments.

FIG. 31 shows an exemplary syntax structure of a geometry attribute coding bitstream (GeometricAttributeCoding_bitstream (dimension)) descriptor according to embodiments.

BEST MODE

Figure 1:
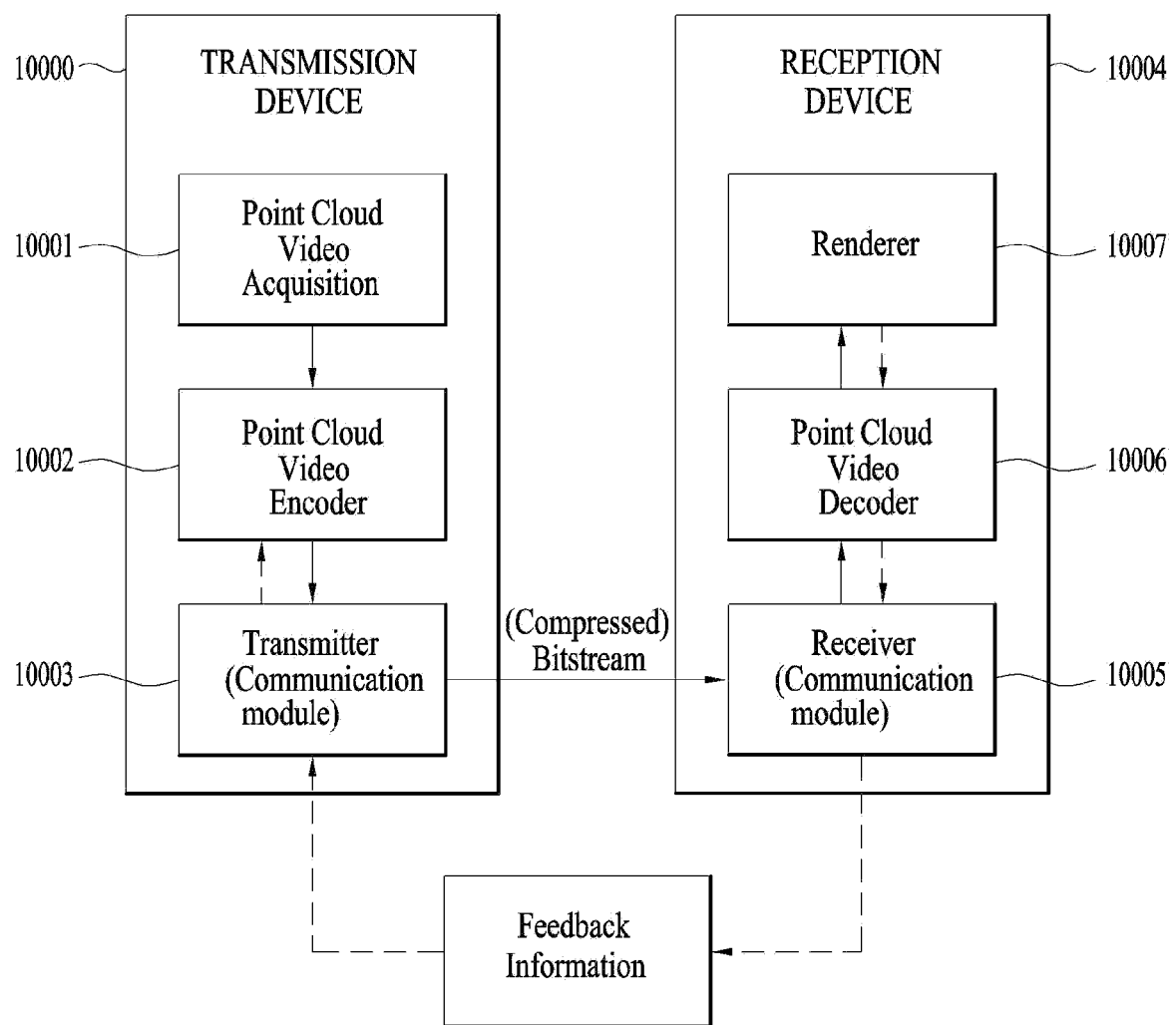
FIG. 1 illustrates an exemplary point cloud content providing system according to embodiments.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated.

It should be noted that the following examples are only for embodying the present disclosure and do not limit the scope of the present disclosure. What can be easily inferred by an expert in the technical field to which the present invention belongs from the detailed description and examples of the present disclosure is to be interpreted as being within the scope of the present disclosure.

The detailed description in this present specification should be construed in all aspects as illustrative and not restrictive. The scope of the disclosure should be determined by the appended claims and their legal equivalents, and all changes coming within the meaning and equivalency range of the appended claims are intended to be embraced therein.

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details. Although most terms used in this specification have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings. In addition, the following drawings and detailed description should not be construed as being limited to the specifically described embodiments, but should be construed as including equivalents or substitutes of the embodiments described in the drawings and detailed description.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquisition unit 10001, a point cloud video encoder 10002, and/or a transmitter (or communication module) 10003.

The point cloud video acquisition unit 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component or module) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/ or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video decoder 10006 may perform a decoding operation based on the feedback information. The reception device 10004 may transmit the feedback information to the transmission device 10000. The transmission device 10000 (or the point cloud video encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmitting device, a transmitter, a transmission system, or the like, and the reception device 10004 may be called a decoder, a receiving device, a receiver, a reception system, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
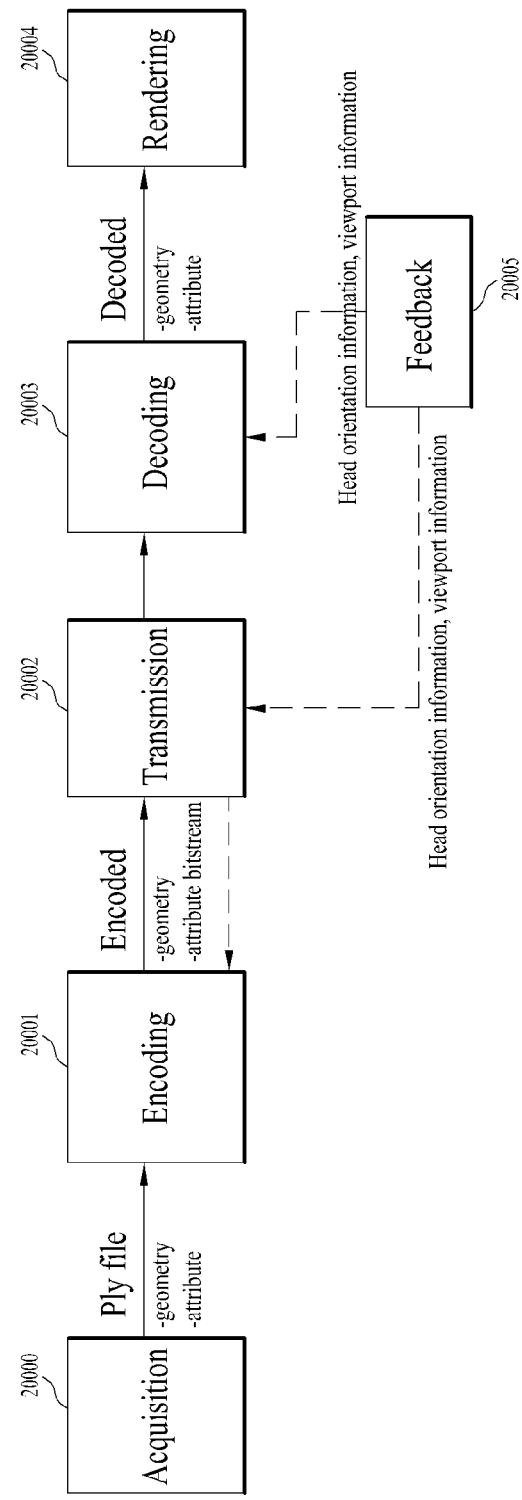
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquisition unit 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquisition unit 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
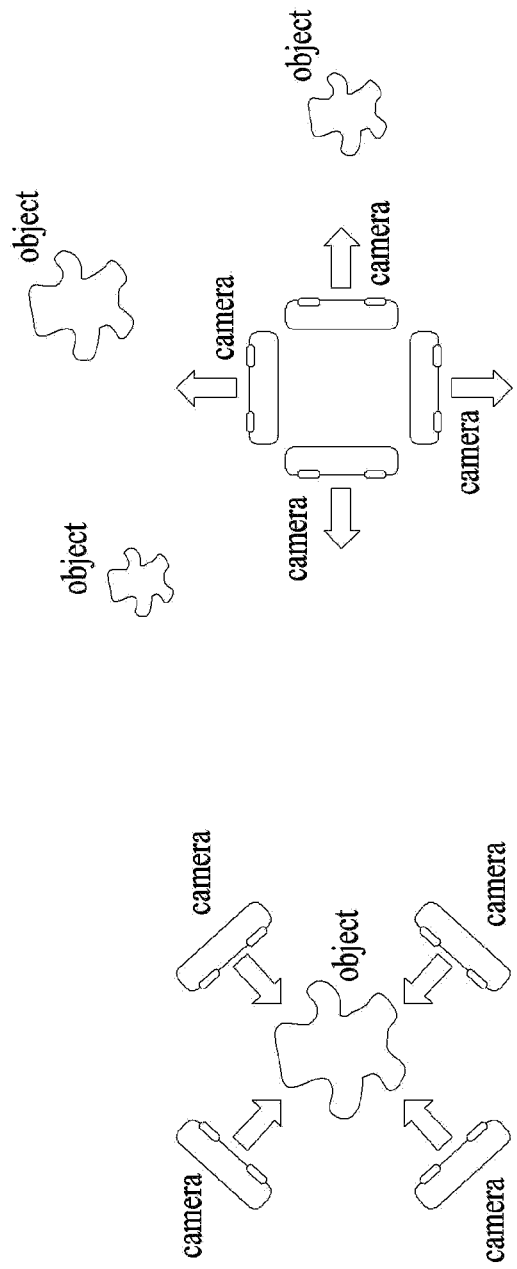
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in FIG. 3, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
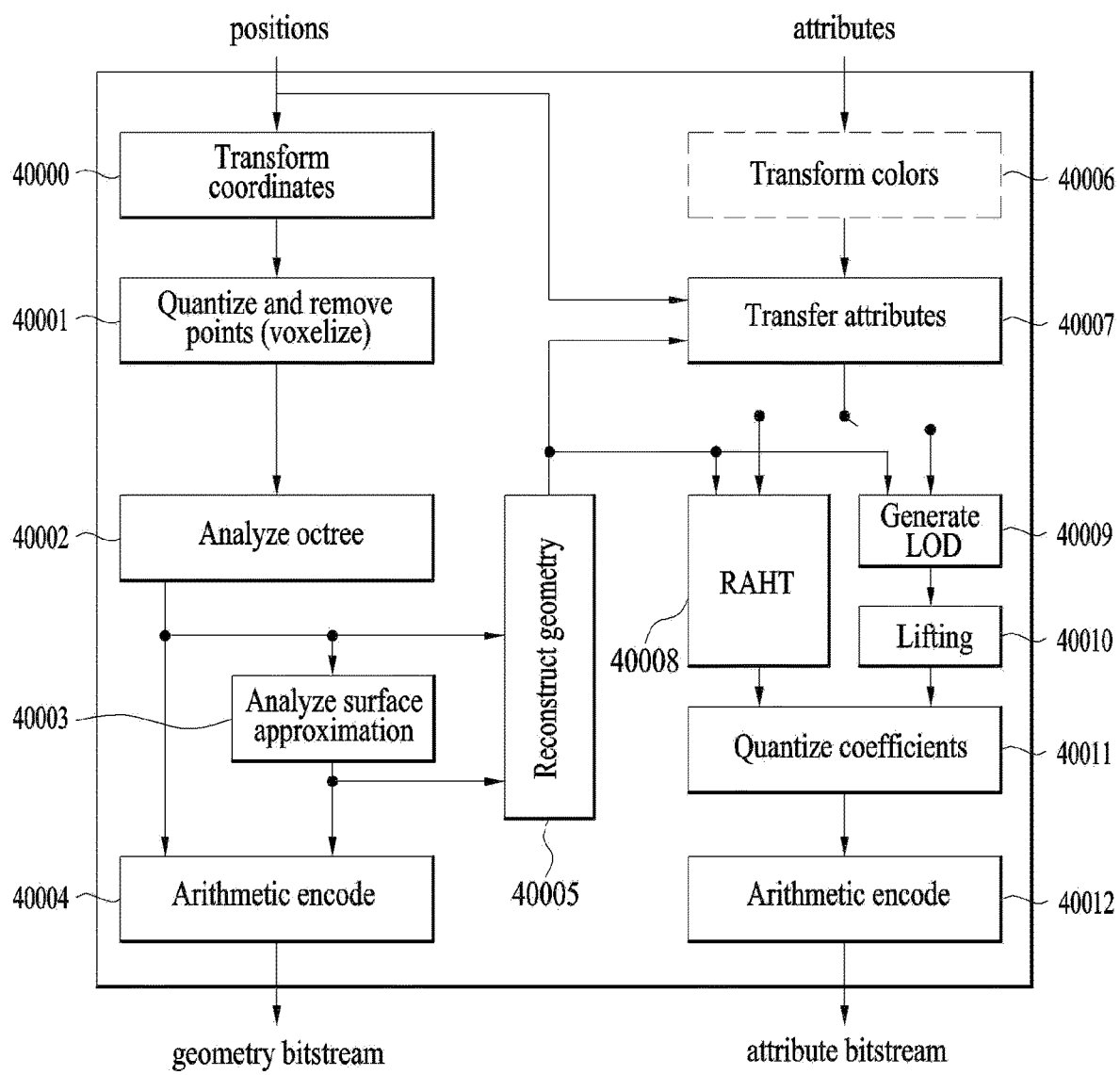
FIG. 4 illustrates an exemplary block diagram of point cloud video encoder according to embodiments.

FIG. 4 illustrates an exemplary point cloud video encoder according to embodiments.

FIG. 4 shows an example of the point cloud video encoder 10002 of FIG. 1. The point cloud video encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 to 2, the point cloud video encoder may perform geometry encoding and attribute encoding. The geometry encoding is performed before the attribute encoding.

The point cloud video encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometric reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry information. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. The voxelization means a minimum unit representing position information in 3D space Points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center point of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD). The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud video encoder of FIG. 4 may be implemented by hardware including one or more processors or integrated circuits configured to communicate with one or more memories included in the point cloud content providing apparatus, software, firmware, or a combination thereof. The one or more processors may perform at least one of the operations and/or functions of the elements of the point cloud video encoder of FIG. 4 described above. Additionally, the one or more processors may operate or execute a set of software programs and/or instructions for performing the operations and/or functions of the elements of the point cloud video encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
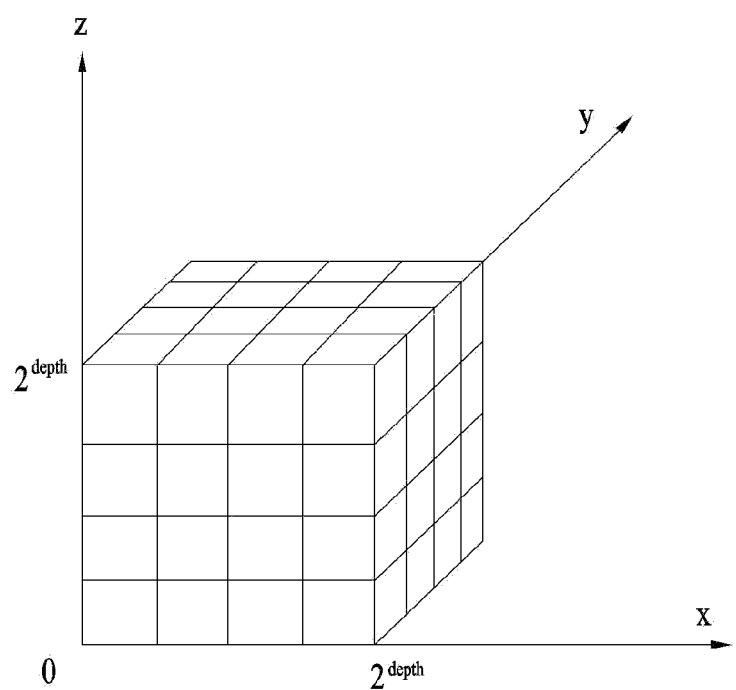
FIG. 5 illustrates an example of voxels in a 3D space according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud video encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the octree analyzer 40002 of the point cloud video encoder performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, $2^d$ may be set to a value constituting the smallest bounding box surrounding all points of the point cloud content (or point cloud video). Here, d denotes the depth of the octree. The value of d is determined in Equation 1. In Equation 1, ($x^{int}_n$, $y^{int}_n$, $z^{int}_n$) denotes the positions (or position values) of quantized points.

$$d = \text{Ceil}(\text{Log } 2(\text{Max}(x_n^{int}, y_n^{int}, z_n^{int}, n=1, \ldots, N)+1)) \quad \text{Equation 1}$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud video encoder (for example, the arithmetic encoder 40004) according to the embodiments may perform entropy encoding on the occupancy codes. In order to increase the compression efficiency, the point cloud video encoder may perform intra/inter-coding on the occupancy codes. The reception device (for example, the reception device 10004 or the point cloud video decoder 10006) according to the embodiments reconstructs the octree based on the occupancy codes.

The point cloud video encoder (for example, the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud video encoder according to the embodiments may skip voxelization and perform direct coding to directly code the positions of points included in the specific region. The coordinates of a direct coding point according to the embodiments are referred to as direct coding mode (DCM). The point cloud video encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud video decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud video encoder (or the arithmetic encoder 40004) according to the embodiments may perform entropy coding on the positions (or position values) of the points.

The point cloud video encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud video encoder according to the embodiments may specify a level at which trisoup geometry encoding is to be applied. For example, when the specific level is equal to the depth of the octree, the point cloud video encoder does not operate in the trisoup mode. In other words, the point cloud video encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud video encoder according to the embodiments may perform entropy encoding on the starting point (x, y, z) of the edge, the direction vector ($\Delta x, \Delta y, \Delta z$) of the edge, and the vertex position value (relative position value within the edge). When the trisoup geometry encoding is applied, the point cloud video encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed according to Equation 2 by: i) calculating the centroid value of each vertex, ii) subtracting the center value from each vertex value, and iii) estimating the sum of the squares of the values obtained by the subtraction.

Equation 2

$$\begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix} \qquad 1$$

$$\begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix} \qquad 2$$

-continued $$\begin{bmatrix} \sigma_x^2 \\ \sigma_y^2 \\ \sigma_z^2 \end{bmatrix} = \sum_{i=1}^{n} \begin{bmatrix} \overline{x}_i^2 \\ \overline{y}_i^2 \\ \overline{z}_i^2 \end{bmatrix} \quad 3$$

Then, the minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through a tan 2(bi, ai), and the vertices are ordered based on the value of θ. The table 1 below shows a combination of vertices for creating a triangle according to the number of the vertices. The vertices are ordered from 1 to n. The table 1 below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

[Table 1] Triangles formed from vertices ordered 1, . . . , n

TABLE 1

| n | Triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud video encoder according to the embodiments may voxelize the refined vertices. In addition, the point cloud video encoder may perform attribute encoding based on the voxelized positions (or position values).

FIG. 7 shows an example of a neighbor node pattern according to embodiments.

In order to increase the compression efficiency of the point cloud video, the point cloud video encoder according to the embodiments may perform entropy coding based on context adaptive arithmetic coding.

As described with reference to FIGS. 1 to 6, the point cloud content providing system or the point cloud video encoder 10002 of FIG. 1, or the point cloud video encoder or arithmetic encoder 40004 of FIG. 4 may perform entropy coding on the occupancy code immediately. In addition, the point cloud content providing system or the point cloud video encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using $2^3=8$ methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud video encoder according to the embodiments determines occupancy of neighbor nodes of each node of the octree and obtains a value of a neighbor pattern. The neighbor node pattern is used to infer the occupancy pattern of the node. The up part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The down part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud video encoder may perform coding according to the neighbor node pattern value (for example, when the neighbor node pattern value is 63, 64 kinds of coding may be performed). According to embodiments, the point cloud video encoder may reduce coding complexity by changing a neighbor node pattern value (for example, based on a table by which 64 is changed to 10 or 6).

Figure 8:
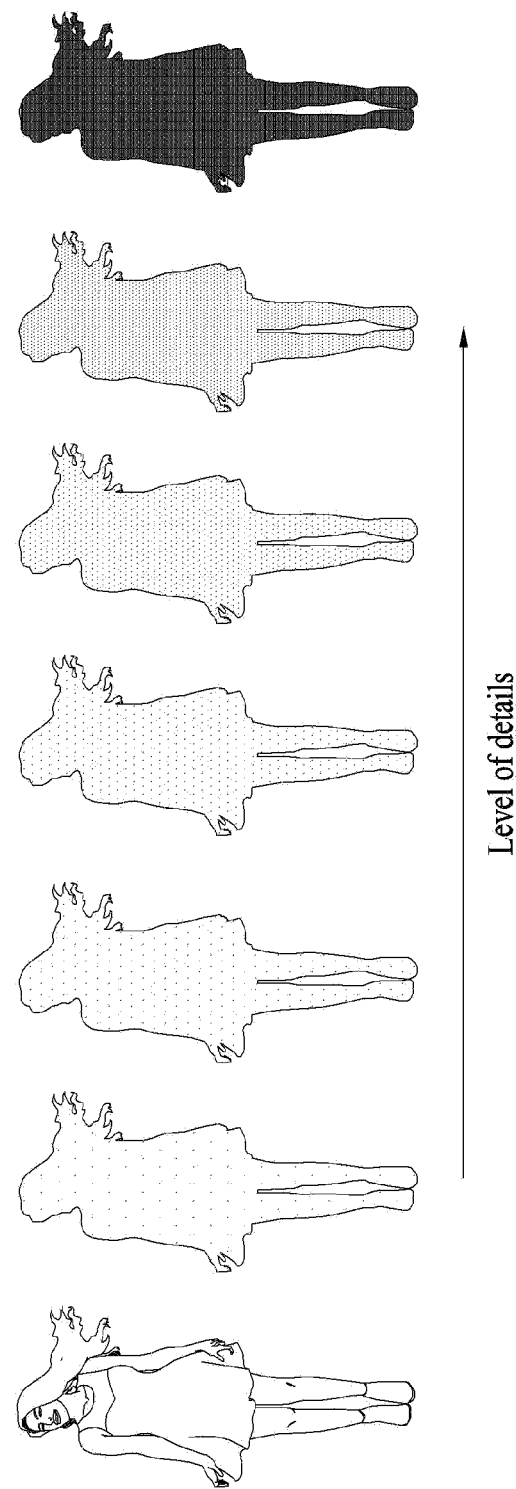
FIG. 8 illustrates an example of point configuration of a point cloud content for each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud video encoder (for example, the LOD generator 40009) may classify (reorganize or group) points by LOD. FIG. 8 shows the point cloud content corresponding to LODs. The leftmost picture in FIG. 8 represents original point cloud content. The second picture from the left of FIG. 8 represents distribution of the points in the lowest LOD, and the rightmost picture in FIG. 8 represents distribution of the points in the highest LOD. That is, the points in the lowest LOD are sparsely distributed, and the points in the highest LOD are densely distributed. That is, as the LOD rises in the direction pointed by the arrow indicated at the bottom of FIG. 8, the space (or distance) between points is narrowed.

Figure 9:
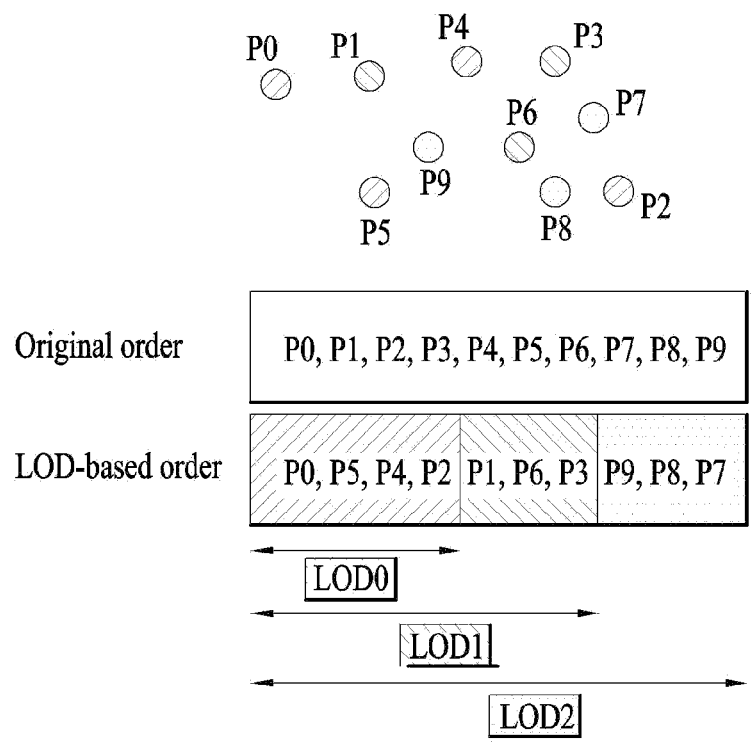
FIG. 9 illustrates an example of point configuration of a point cloud content for each LOD according to embodiments.

FIG. 9 illustrates an example of point configuration for each LOD according to embodiments.

As described with reference to FIGS. 1 to 8, the point cloud content providing system, or the point cloud video encoder (for example, the point cloud video encoder 10002 of FIG. 1, the point cloud video encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud video encoder, but also by the point cloud video decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud video encoder according to the embodiments may perform prediction transform coding based on LOD, lifting transform coding based on LOD, and RAHT transform coding selectively or in combination.

The point cloud video encoder according to the embodiments may generate a predictor for points to perform prediction transform coding based on LOD for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud video encoder according to the embodiments (for example, the coefficient quantizer 40011) may quantize and inversely quantize the residual of each point (which may be called residual attribute, residual attribute value, attribute prediction residual value or prediction error attribute value and so on) obtained by subtracting a predicted attribute (or attribute value) each point from the attribute (i.e., original attribute value) of each point. The quantization process performed for a residual attribute value in a transmission device is configured as shown in table 2. The inverse quantization process performed for a residual attribute value in a reception device is configured as shown in table 3.

TABLE 2

```
int PCCQuantization(int value, int quantStep) {
if( value >=0) {
return floor(value / quantStep + 1.0 / 3.0);
} else {
return -floor(-value / quantStep + 1.0 / 3.0);
}
```

TABLE 2-continued

```
}
```

TABLE 3

```
int PCCInverseQuantization(int value, int quantStep) {
if( quantStep ==0) {
return value;
} else {
return value * quantStep;
}
}
```

When the predictor of each point has neighbor points, the point cloud video encoder (e.g., the arithmetic encoder 40012) according to the embodiments may perform entropy coding on the quantized and inversely quantized residual attribute values as described above. When the predictor of each point has no neighbor point, the point cloud video encoder according to the embodiments (for example, the arithmetic encoder 40012) may perform entropy coding on the attributes of the corresponding point without performing the above-described operation.

The point cloud video encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud video encoder (e.g., coefficient quantizer 40011) according to the embodiments quantizes the predicted attribute values. In addition, the point cloud video encoder (e.g., the arithmetic encoder 40012) performs entropy coding on the quantized attribute values.

The point cloud video encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud video encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

Equation 3 below represents a RAHT transformation matrix. In Equation 3, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1 = w_{l_{2x,y,z}}$ and $w2 = w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix} \quad T_{w1w2} = \frac{1}{\sqrt{w1+w2}} \begin{bmatrix} \sqrt{w1} & \sqrt{w2} \\ -\sqrt{w2} & \sqrt{w1} \end{bmatrix} \quad \text{Equation 3}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 40012). The weights are calculated as $w_{l-1_{x,y,z}} = w_{l_{2x,y,z}} + w_{l_{2x+1,y,z}}$. The root node is created through the $g_{1_{0,0,0}}$ and $g_{1_{0,0,1}}$ as Equation 4.

$$\begin{bmatrix} gDC \\ h0_{0,0,0} \end{bmatrix} = T_{w1000w1001} \begin{bmatrix} g_{1_{0,0,0z}} \\ g_{1_{0,0,1}} \end{bmatrix} \quad \text{Equation 4}$$

The value of gDC is also quantized and subjected to entropy coding like the high-pass coefficients.

Figure 10:
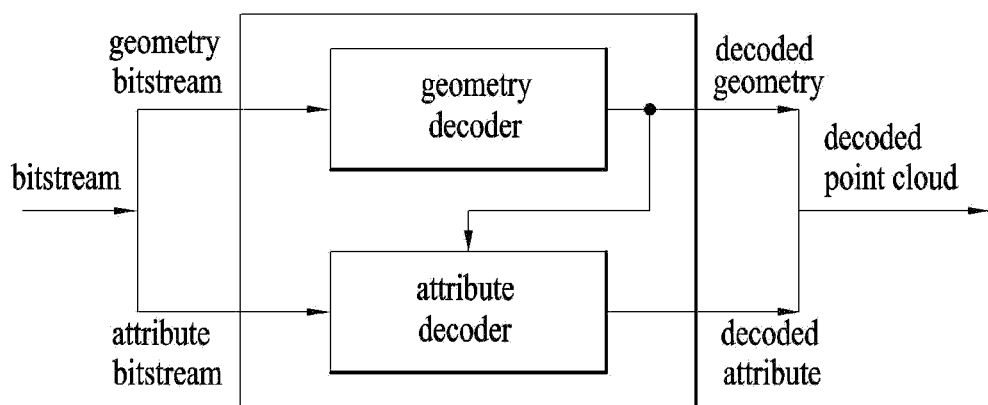
FIG. 10 illustrates an example of a block diagram of a point cloud video decoder according to embodiments.

FIG. 10 illustrates a point cloud video decoder according to embodiments.

The point cloud video decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud video decoder may receive a geometry bitstream and an attribute bitstream contained in one or more bitstreams. The point cloud video decoder includes a geometry decoder and an attribute decoder. The geometry decoder performs geometry decoding on the geometry bitstream and outputs decoded geometry. The attribute decoder performs attribute decoding on the attribute bitstream based on the decoded geometry, and outputs decoded attributes. The decoded geometry and decoded attributes are used to reconstruct point cloud content (a decoded point cloud).

Figure 11:
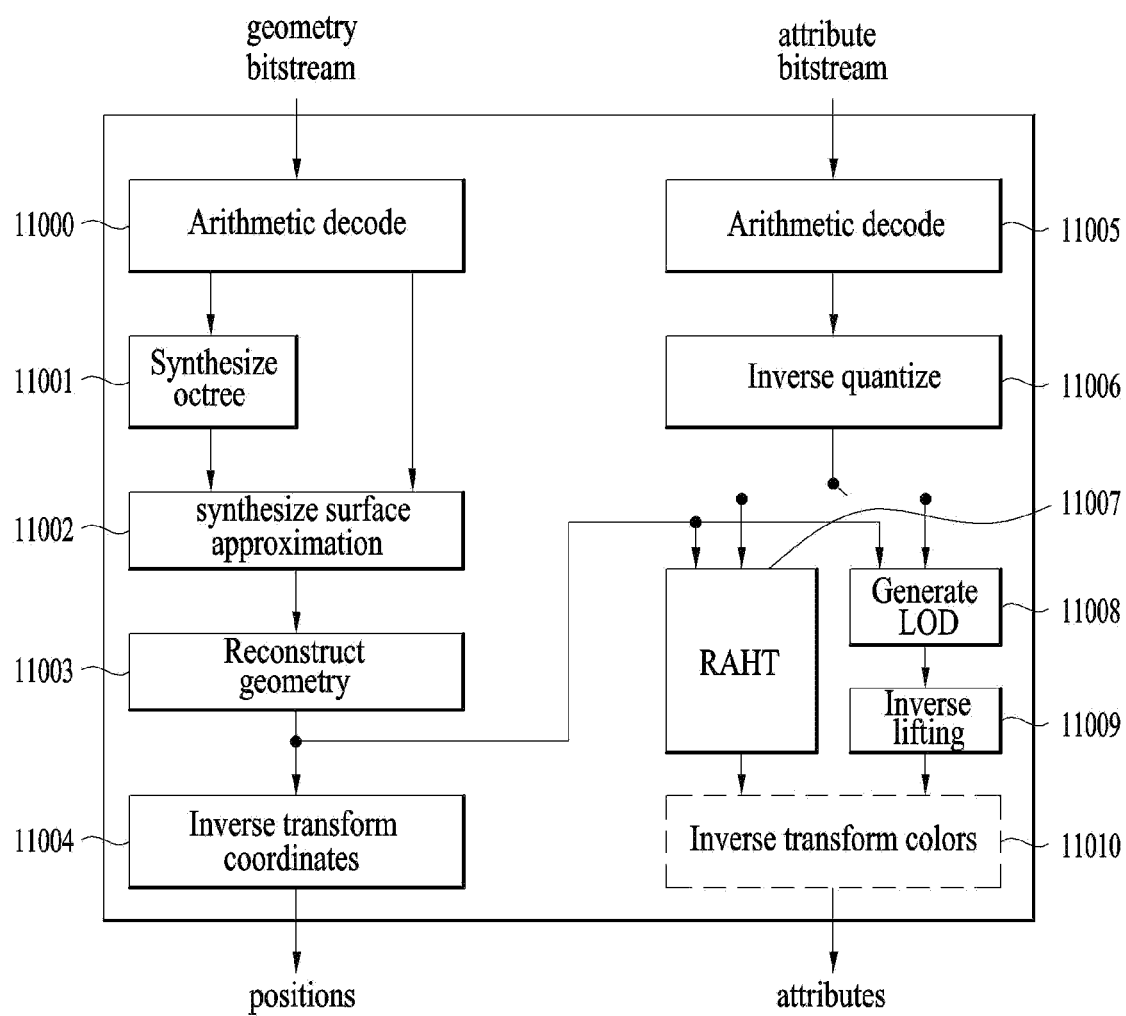
FIG. 11 illustrates an example of a point cloud video decoder according to embodiments.

FIG. 11 illustrates a point cloud video decoder according to embodiments.

The point cloud video decoder illustrated in FIG. 11 is an example of the point cloud video decoder illustrated in FIG. 10, and may perform a decoding operation, which is an inverse process of the encoding operation of the point cloud video encoder illustrated in FIGS. 1 to 9.

As described with reference to FIGS. 1 and 10, the point cloud video decoder may perform geometry decoding and attribute decoding. The geometry decoding is performed before the attribute decoding.

The point cloud video decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct decoding and trisoup geometry decoding. The direct decoding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud video encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud video encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud video encoder.

Although not shown in the figure, the elements of the point cloud video decoder of FIG. 11 may be implemented by hardware including one or more processors or integrated circuits configured to communicate with one or more memories included in the point cloud content providing apparatus, software, firmware, or a combination thereof. The one or more processors may perform at least one or more of the operations and/or functions of the elements of the point cloud video decoder of FIG. 11 described above. Additionally, the one or more processors may operate or execute a set of software programs and/or instructions for performing the operations and/or functions of the elements of the point cloud video decoder of FIG. 11.

Figure 12:
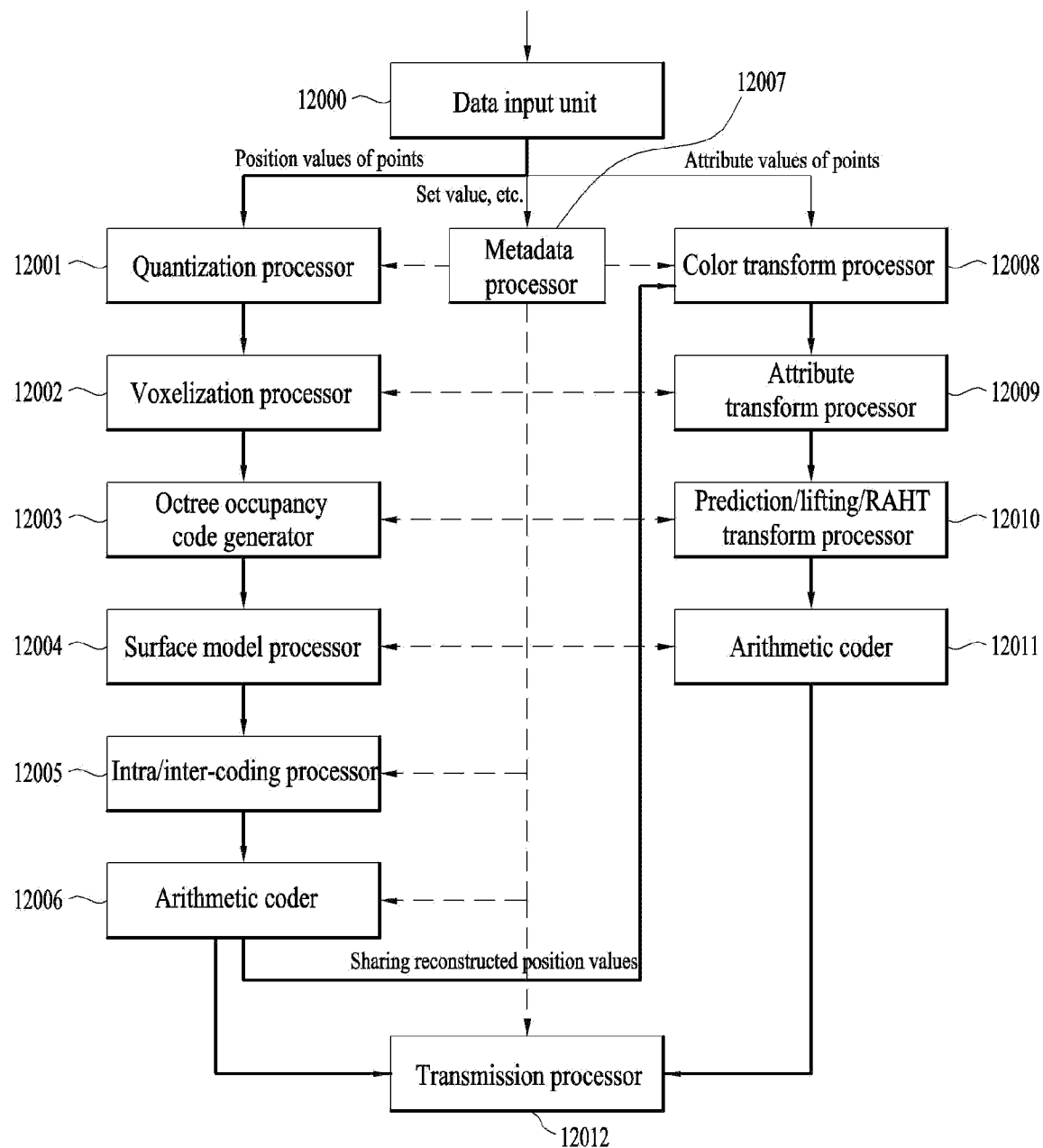
FIG. 12 illustrates a configuration for point cloud video encoding of a transmission device according to embodiments.

FIG. 12 illustrates a transmission device according to embodiments.

The transmission device shown in FIG. 12 is an example of the transmission device 10000 of FIG. 1 (or the point cloud video encoder of FIG. 4). The transmission device illustrated in FIG. 12 may perform one or more of the operations and methods the same as or similar to those of the point cloud video encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a LOD/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquisition unit 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 12002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud video encoder (or the octree analyzer 40002) described with reference to FIGS. 4 and 6. Details are the same as those described with reference to FIGS. 1 to 9.

The surface model processor 12004 according to the embodiments may perform trigsoup geometry encoding based on a surface model to reconstruct the positions of points in a specific region (or node) on a voxel basis. The surface model processor 12004 may perform an operation and/or method the same as or similar to the operation and/or method of the point cloud video encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the LOD/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The LOD/lifting/RAHT transform processor 12010 according to the embodiments may code the transformed attributes by any one or a combination of RAHT coding, prediction transform coding, and lifting transform coding. The LOD/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 40012.

The transmission processor 12012 according to the embodiments may transmit each bitstream containing encoded geometry and/or encoded attributes and/or metadata (or metadata information), or transmit one bitstream configured with the encoded geometry and/or the encoded attributes and/or the metadata. When the encoded geometry and/or the encoded attributes and/or the metadata according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS or tile inventory) for signaling of a tile level, and slice data. The slice data may include information about one or more slices. One slice according to embodiments may include one geometry bitstream Geom0$^0$ and one or more attribute bitstreams Attr0$^0$ and Attr1$^0$. The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
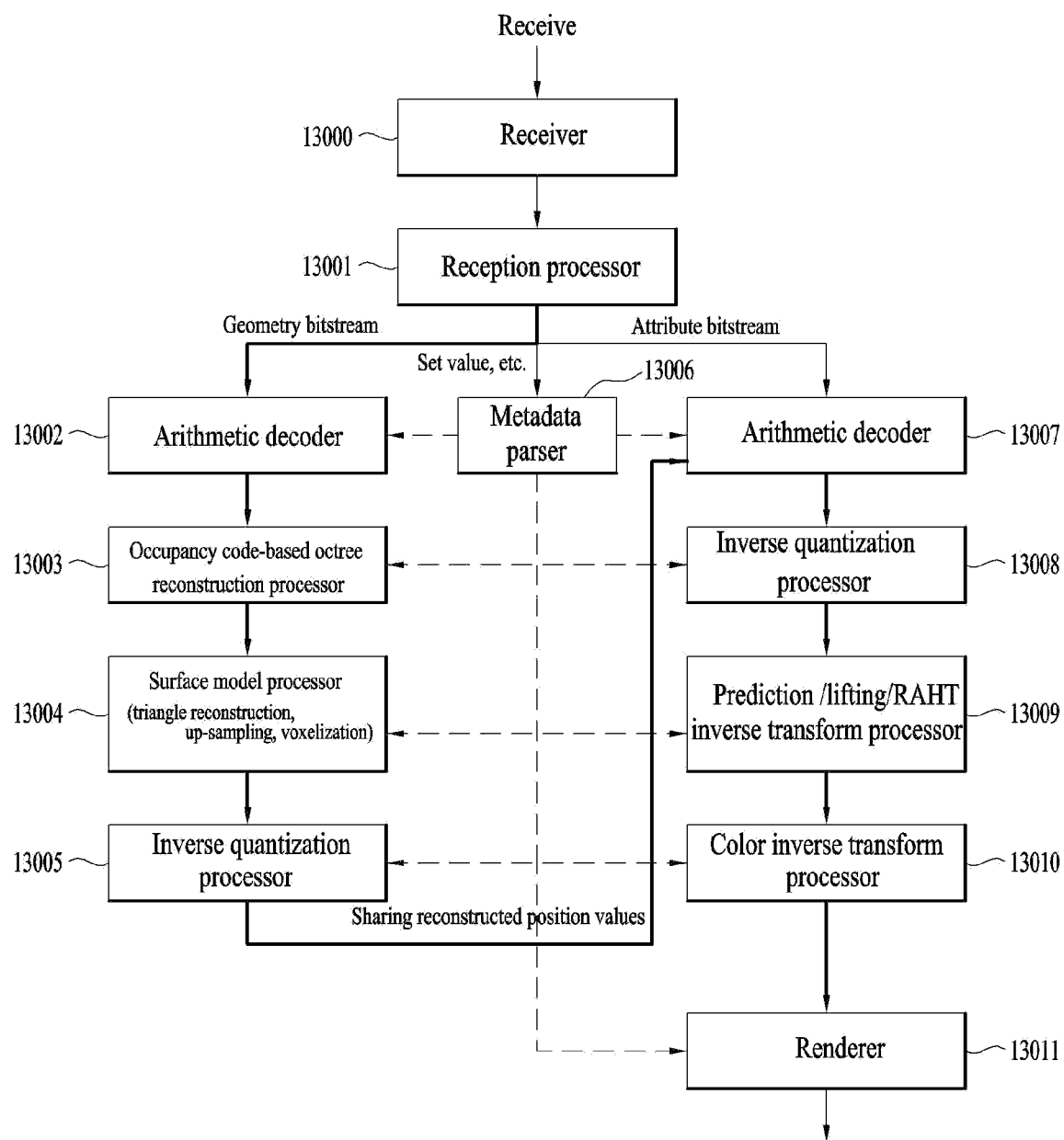
FIG. 13 illustrates a configuration for point cloud video decoding of a reception device according to embodiments.

FIG. 13 illustrates a reception device according to embodiments.

The reception device illustrated in FIG. 13 is an example of the reception device 10004 of FIG. 1 (or the point cloud video decoder of FIGS. 10 and 11). The reception device illustrated in FIG. 13 may perform one or more of the operations and methods the same as or similar to those of the point cloud video decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a LOD/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 1302 according to the embodiments may perform trisoup geometry decoding and related geometry reconstruction (for example, triangle reconstruction, up-sampling, voxelization) based on the surface model method. The surface model processor 1302 performs an operation the same as or similar to that of the surface approximation synthesizer 11002 and/or the geometry reconstructor 11003.

The inverse quantization processor 1305 according to the embodiments may inversely quantize the decoded geometry.

The metadata parser 1306 according to the embodiments may parse metadata contained in the received point cloud data, for example, a set value. The metadata parser 1306 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the LOD/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The LOD/lifting/RAHT inverse transformer 13009 according to the embodiments may process the reconstructed geometry and the inversely quantized attributes. The prediction/lifting/RAHT inverse transform processor 1301 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
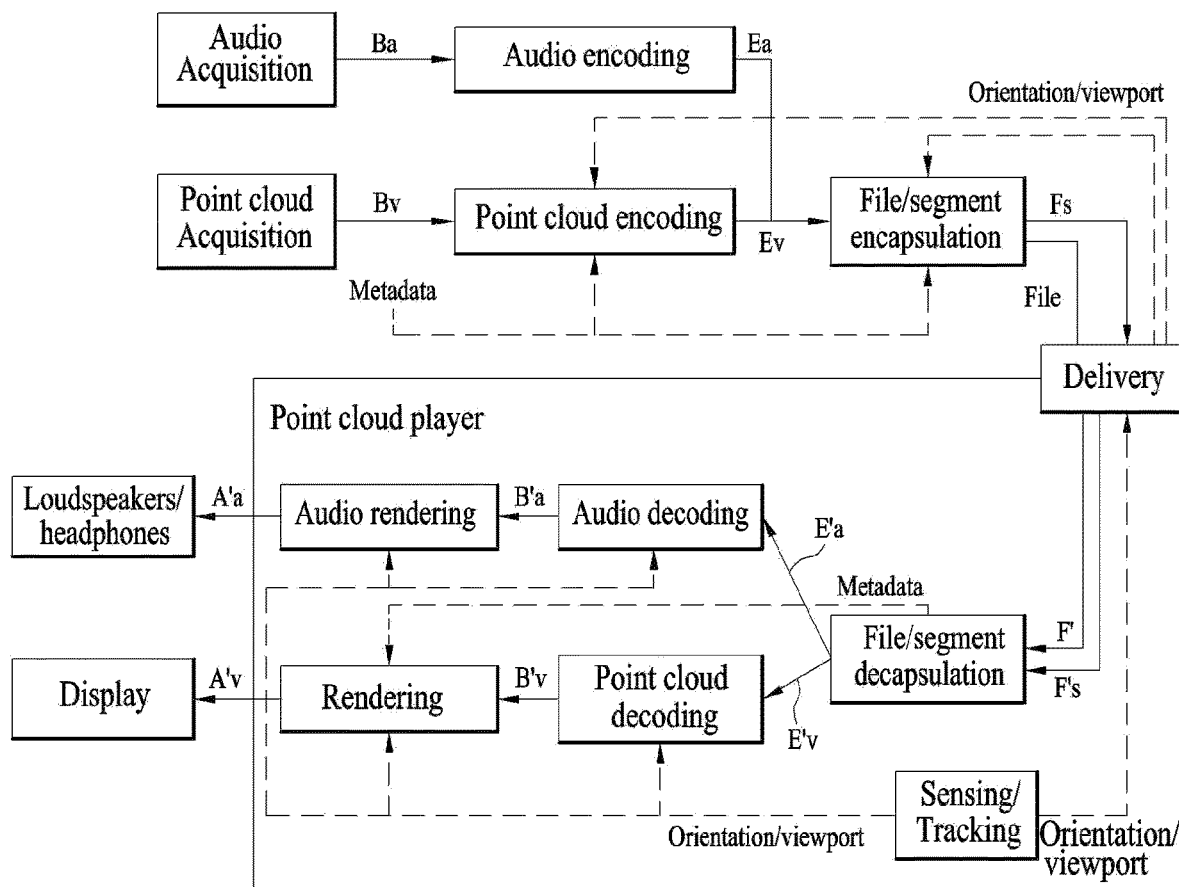
FIG. 14 illustrates an architecture for storing and streaming of G-PCC-based point cloud data according to embodiments.

FIG. 14 illustrates an architecture for G-PCC-based point cloud content streaming according to embodiments.

The upper part of FIG. 14 shows a process of processing and transmitting point cloud content by the transmission device described in FIGS. 1 to 13 (for example, the transmission device 10000, the transmission device of FIG. 12, etc.).

As described with reference to FIGS. 1 to 13, the transmission device may acquire audio Ba of the point cloud content (Audio Acquisition), encode the acquired audio (Audio Encoding), and output an audio bitstream Ea. In addition, the transmission device may acquire a point cloud (or point cloud video) By of the point cloud content (Point Acquisition), and perform point cloud video encoding on the acquired point cloud to output a point cloud video bitstream Ev. The point cloud video encoding of the transmission device is the same as or similar to the point cloud video encoding described with reference to FIGS. 1 to 13 (for example, the encoding of the point cloud video encoder of FIG. 4), and thus a detailed description thereof will be omitted.

The transmission device may encapsulate the generated audio bitstream and video bitstream into a file and/or a segment (File/segment encapsulation). The encapsulated file and/or segment Fs, File may include a file in a file format such as ISOBMFF or a dynamic adaptive streaming over HTTP (DASH) segment. Point cloud-related metadata according to embodiments may be contained in the encapsulated file format and/or segment. The metadata may be contained in boxes of various levels on the ISO International Standards Organization Base Media File Format (ISOBMFF) file format, or may be contained in a separate track within the file. According to an embodiment, the transmission device may encapsulate the metadata into a separate file. The transmission device according to the embodiments may deliver the encapsulated file format and/or segment over a network. The processing method for encapsulation and transmission by the transmission device is the same as that described with reference to FIGS. 1 to 13 (for example, the transmitter 10003, the transmission step 20002 of FIG. 2, etc.), and thus a detailed description thereof will be omitted.

The lower part of FIG. 14 shows a process of processing and outputting point cloud content by the reception device (for example, the reception device 10004, the reception device of FIG. 13, etc.) described with reference to FIGS. 1 to 13.

According to embodiments, the reception device may include devices configured to output final audio data and final video data (e.g., loudspeakers, headphones, a display), and a point cloud player configured to process point cloud content (a point cloud player). The final data output devices and the point cloud player may be configured as separate physical devices. The point cloud player according to the embodiments may perform geometry-based point cloud compression (G-PCC) coding, video-based point cloud compression (V-PCC) coding and/or next-generation coding.

The reception device according to the embodiments may secure a file and/or segment F', Fs' contained in the received data (for example, a broadcast signal, a signal transmitted over a network, etc.) and decapsulate the same (File/segment decapsulation). The reception and decapsulation methods of the reception device is the same as those described with reference to FIGS. 1 to 13 (for example, the receiver 10005, the reception unit 13000, the reception processing unit 13001, etc.), and thus a detailed description thereof will be omitted.

The reception device according to the embodiments secures an audio bitstream E'a and a video bitstream E'v contained in the file and/or segment. As shown in the figure, the reception device outputs decoded audio data B'a by performing audio decoding on the audio bitstream, and renders the decoded audio data (audio rendering) to output final audio data A'a through loudspeakers or headphones.

Also, the reception device performs point cloud video decoding on the video bitstream E'v and outputs decoded video data B'v. The point cloud video decoding according to the embodiments is the same as or similar to the point cloud video decoding described with reference to FIGS. 1 to 13 (for example, decoding of the point cloud video decoder of FIG. 11), and thus a detailed description thereof will be omitted. The reception device may render the decoded video data and output final video data through the display.

The reception device according to the embodiments may perform at least one of decapsulation, audio decoding, audio rendering, point cloud video decoding, and point cloud video rendering based on the transmitted metadata. The details of the metadata are the same as those described with reference to FIGS. 12 to 13, and thus a description thereof will be omitted.

As indicated by a dotted line shown in the figure, the reception device according to the embodiments (for example, a point cloud player or a sensing/tracking unit in the point cloud player) may generate feedback information (orientation, viewport). According to embodiments, the feedback information may be used in a decapsulation process, a point cloud video decoding process and/or a rendering process of the reception device, or may be delivered to the transmission device. Details of the feedback information are the same as those described with reference to FIGS. 1 to 13, and thus a description thereof will be omitted.

Figure 15:
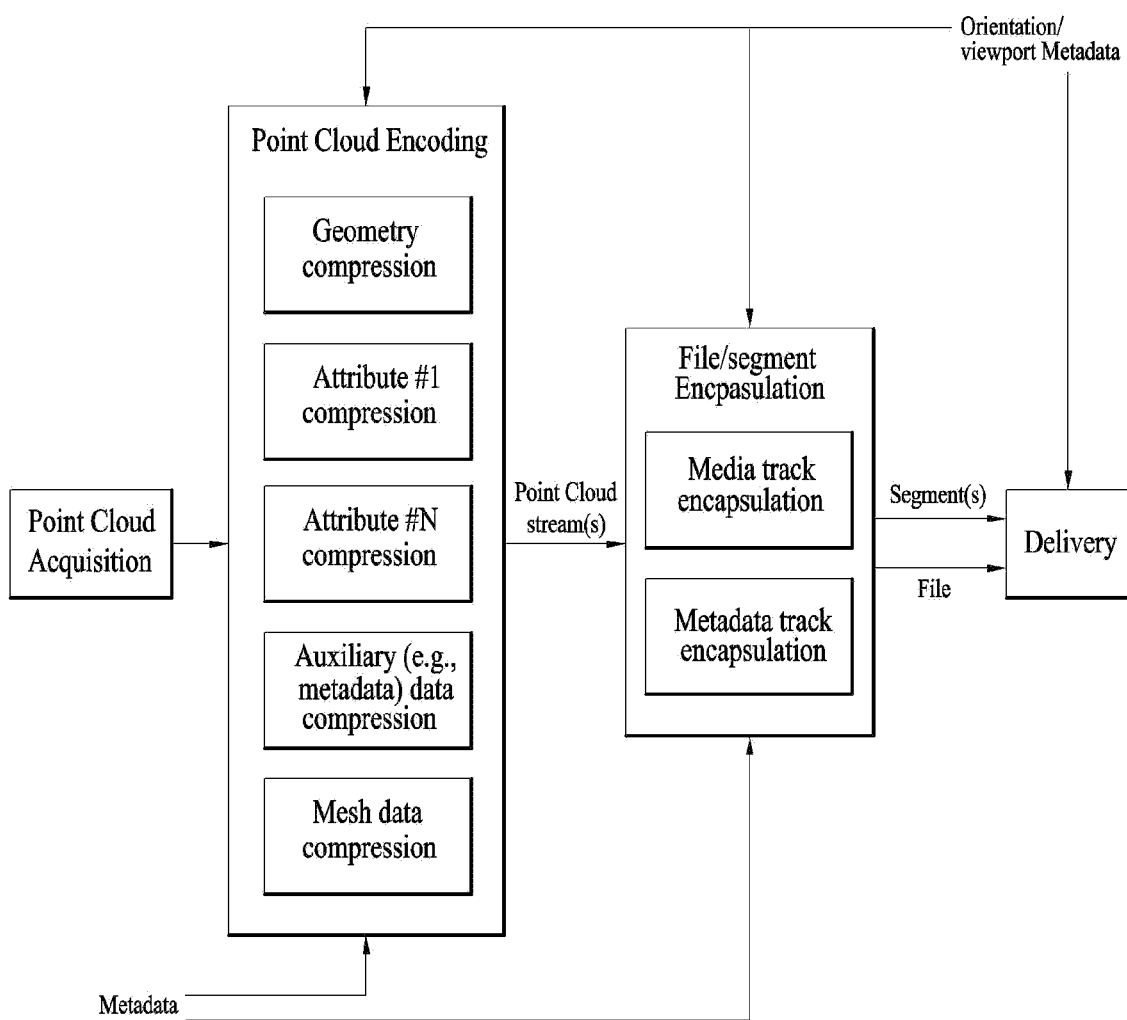
FIG. 15 illustrates an example of storage and transmission of point cloud data according to embodiments.

FIG. 15 shows an exemplary transmission device according to embodiments.

The transmission device of FIG. 15 is a device configured to transmit point cloud content, and corresponds to an example of the transmission device described with reference to FIGS. 1 to 14 (e.g., the transmission device 10000 of FIG. 1, the point cloud video encoder of FIG. 4, the transmission device of FIG. 12, the transmission device of FIG. 14). Accordingly, the transmission device of FIG. 15 performs an operation that is identical or similar to that of the transmission device described with reference to FIGS. 1 to 14.

The transmission device according to the embodiments may perform one or more of point cloud acquisition, point cloud video encoding, file/segment encapsulation and delivery.

Since the operation of point cloud acquisition and delivery illustrated in the figure is the same as the operation described with reference to FIGS. 1 to 14, a detailed description thereof will be omitted.

As described above with reference to FIGS. 1 to 14, the transmission device according to the embodiments may perform geometry encoding and attribute encoding. The geometry encoding may be referred to as geometry compression, and the attribute encoding may be referred to as attribute compression. As described above, one point may have one geometry and one or more attributes. Accordingly, the transmission device performs attribute encoding on each attribute. The figure illustrates that the transmission device performs one or more attribute compressions (attribute #1 compression, . . . , attribute #N compression). In addition, the transmission device according to the embodiments may perform auxiliary compression. The auxiliary compression is performed on the metadata. Details of the metadata are the same as those described with reference to FIGS. 1 to 14, and thus a description thereof will be omitted. The transmission device may also perform mesh data compression. The mesh data compression according to the embodiments may include the trisoup geometry encoding described with reference to FIGS. 1 to 14.

The transmission device according to the embodiments may encapsulate bitstreams (e.g., point cloud streams) output according to point cloud video encoding into a file and/or a segment. According to embodiments, the transmission device may perform media track encapsulation for carrying data (for example, media data) other than the metadata, and perform metadata track encapsulation for carrying metadata. According to embodiments, the metadata may be encapsulated into a media track.

As described with reference to FIGS. 1 to 14, the transmission device may receive feedback information (orientation/viewport metadata) from the reception device, and perform at least one of the point cloud video encoding, file/segment encapsulation, and delivery operations based on the received feedback information. Details are the same as those described with reference to FIGS. 1 to 14, and thus a description thereof will be omitted.

Figure 16:
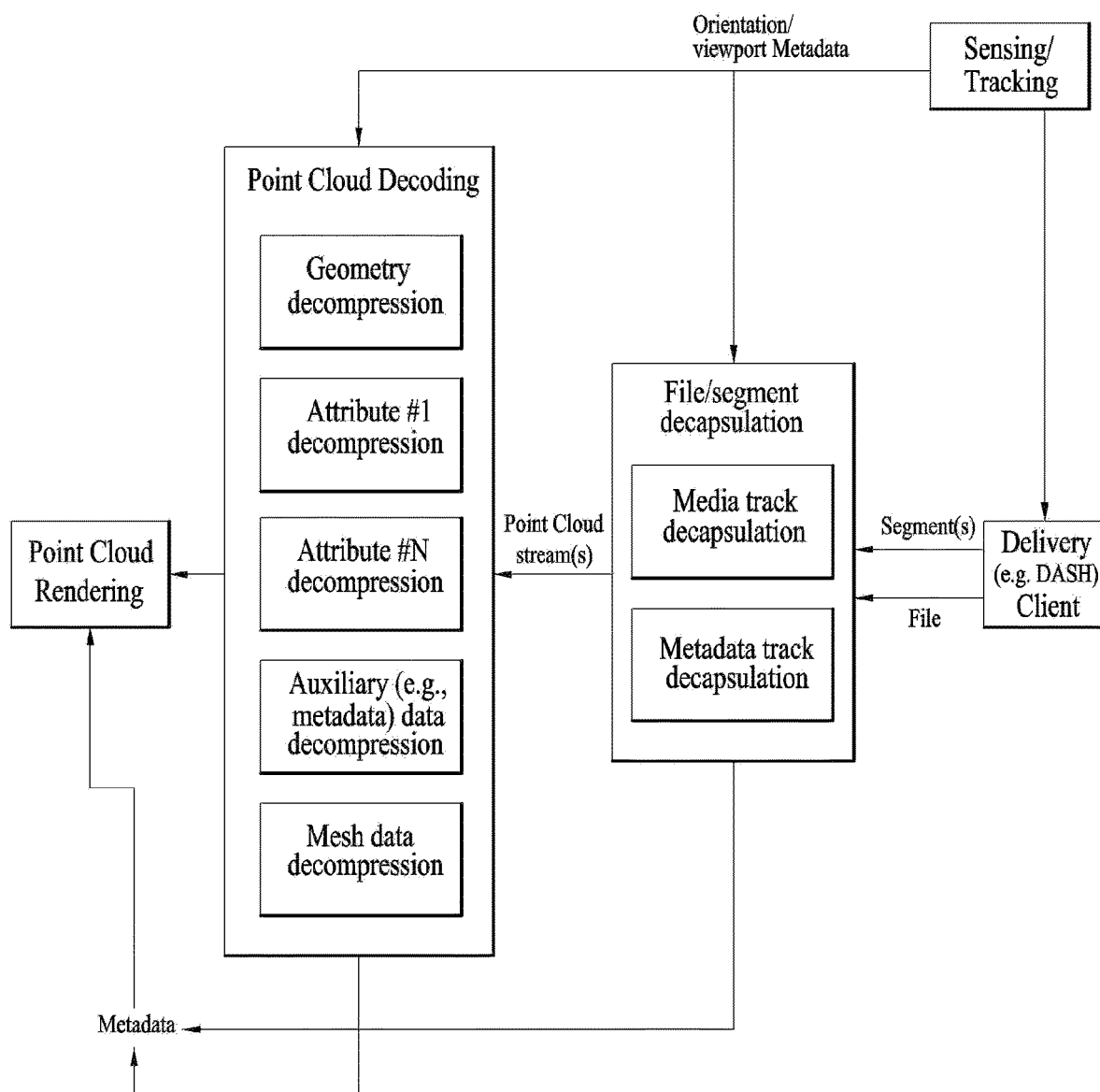
FIG. 16 illustrates an example of a reception device according to embodiments.

FIG. 16 shows an exemplary reception device according to embodiments.

The reception device of FIG. 16 is a device for receiving point cloud content, and corresponds to an example of the reception device described with reference to FIGS. 1 to 14 (for example, the reception device 10004 of FIG. 1, the point cloud video decoder of FIG. 11, and the reception device of FIG. 13, the reception device of FIG. 14). Accordingly, the reception device of FIG. 16 performs an operation that is identical or similar to that of the reception device described with reference to FIGS. 1 to 14. The reception device of FIG. 16 may receive a signal transmitted from the transmission device of FIG. 15, and perform a reverse process of the operation of the transmission device of FIG. 15.

The reception device according to the embodiments may perform at least one of delivery, file/segment decapsulation, point cloud video decoding, and point cloud rendering.

Since the point cloud reception and point cloud rendering operations illustrated in the figure are the same as those described with reference to FIGS. 1 to 14, a detailed description thereof will be omitted.

As described with reference to FIGS. 1 to 14, the reception device according to the embodiments decapsulate the file and/or segment acquired from a network or a storage device. According to embodiments, the reception device may perform media track decapsulation for carrying data (for example, media data) other than the metadata, and perform metadata track decapsulation for carrying metadata. According to embodiments, in the case where the metadata is encapsulated into a media track, the metadata track decapsulation is omitted.

As described with reference to FIGS. 1 to 14, the reception device may perform geometry decoding and attribute decoding on bitstreams (e.g., point cloud streams) secured through decapsulation. The geometry decoding may be referred to as geometry decompression, and the attribute decoding may be referred to as attribute decompression. As described above, one point may have one geometry and one or more attributes, each of which is encoded by the transmission device. Accordingly, the reception device performs attribute decoding on each attribute. The figure illustrates that the reception device performs one or more attribute decompressions (attribute #1 decompression, . . . , attribute #N decompression). The reception device according to the embodiments may also perform auxiliary decompression. The auxiliary decompression is performed on the metadata. Details of the metadata are the same as those described with reference to FIGS. 1 to 14, and thus a disruption thereof will be omitted. The reception device may also perform mesh data decompression. The mesh data decompression according to the embodiments may include the trisoup geometry decoding described with reference to FIGS. 1 to 14. The reception device according to the embodiments may render the point cloud data that is output according to the point cloud video decoding.

As described with reference to FIGS. 1 to 14, the reception device may secure orientation/viewport metadata using a separate sensing/tracking element, and transmit feedback information including the same to a transmission device (for example, the transmission device of FIG. 15). In addition, the reception device may perform at least one of a reception operation, file/segment decapsulation, and point cloud video decoding based on the feedback information. Details are the same as those described with reference to FIGS. 1 to 14, and thus a description thereof will be omitted.

Figure 17:
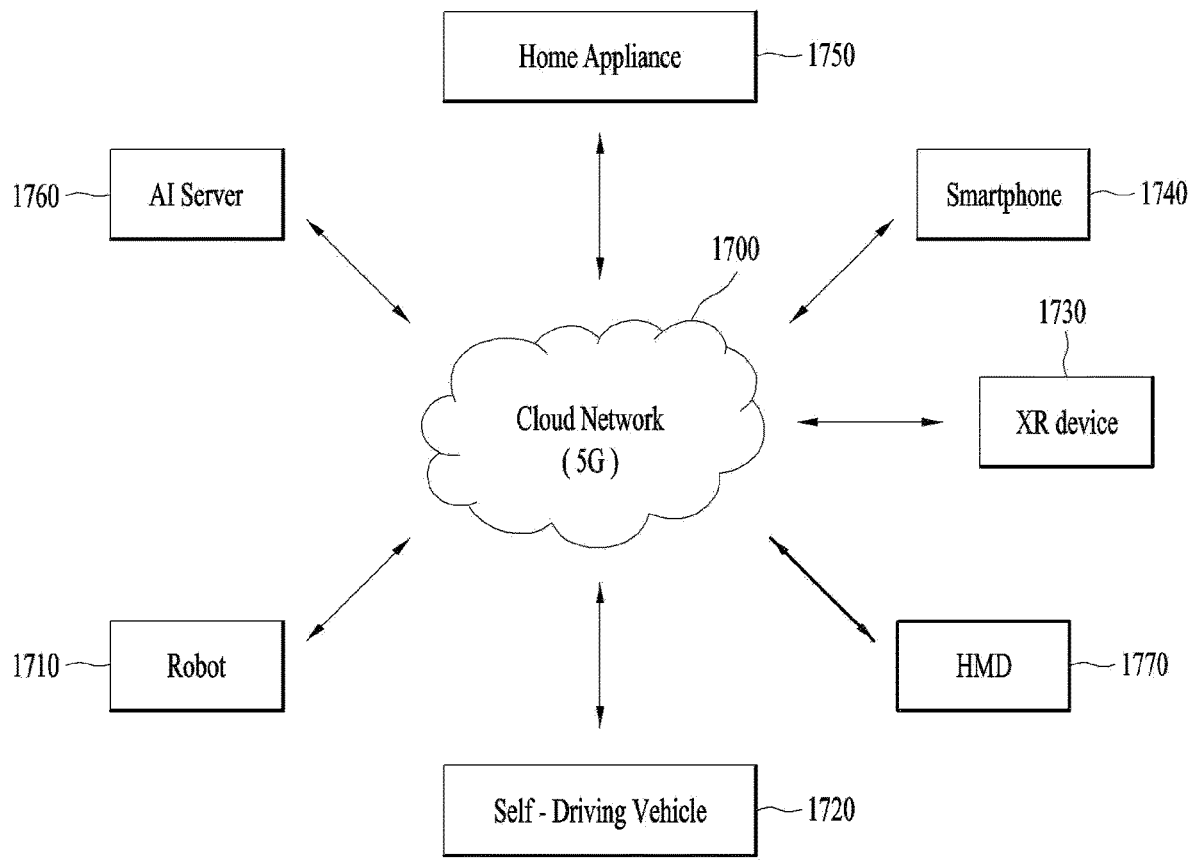
FIG. 17 illustrates an exemplary structure operatively connectable with a method/device for transmitting and receiving point cloud data according to embodiments.

FIG. 17 shows an exemplary structure operatively connectable with a method/device for transmitting and receiving point cloud data according to embodiments.

The structure of FIG. 17 represents a configuration in which at least one of a server 1760, a robot 1710, a self-driving vehicle 1720, an XR device 1730, a smartphone 1740, a home appliance 1750, and/or a head-mount display (HMD) 1770 is connected to a cloud network 1710. The robot 1710, the self-driving vehicle 1720, the XR device 1730, the smartphone 1740, or the home appliance 1750 is referred to as a device. In addition, the XR device 1730 may correspond to a point cloud compressed data (PCC) device according to embodiments or may be operatively connected to the PCC device.

The cloud network 1700 may represent a network that constitutes part of the cloud computing infrastructure or is present in the cloud computing infrastructure. Here, the cloud network 1700 may be configured using a 3G network, 4G or Long Term Evolution (LTE) network, or a 5G network.

The server 1760 may be connected to at least one of the robot 1710, the self-driving vehicle 1720, the XR device 1730, the smartphone 1740, the home appliance 1750, and/or the HMD 1770 over the cloud network 1700 and may assist in at least a part of the processing of the connected devices 1710 to 1770.

The HMD 1770 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1710 to 1750 to which the above-described technology is applied will be described. The devices 1710 to 1750 illustrated in FIG. 17 may be operatively connected/coupled to a point cloud data transmission device and reception according to the above-described embodiments.

<PCC+XR>

The XR/PCC device 1730 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1730 may analyze 3D point cloud data or image data acquired through various sensors or from an external device and generate position data and attribute data about 3D points. Thereby, the XR/PCC device 1730 may acquire information about the surrounding space or a real object, and render and output an XR object. For example, the XR/PCC device 1730 may match an XR object including auxiliary information about a recognized object with the recognized object and output the matched XR object.

<PCC+Self-Driving+XR>

The self-driving vehicle 1720 may be implemented as a mobile robot, a vehicle, an unmanned aerial vehicle, or the like by applying the PCC technology and the XR technology.

The self-driving vehicle 1720 to which the XR/PCC technology is applied may represent a self-driving vehicle provided with means for providing an XR image, or a self-driving vehicle that is a target of control/interaction in the XR image. In particular, the self-driving vehicle 1720 which is a target of control/interaction in the XR image may be distinguished from the XR device 1730 and may be operatively connected thereto.

The self-driving vehicle 1720 having means for providing an XR/PCC image may acquire sensor information from sensors including a camera, and output the generated XR/PCC image based on the acquired sensor information. For example, the self-driving vehicle 1720 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1720 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud compression data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

It has been described above that in order for the transmission device to compress the attributes of the point cloud, the RAHT transform, the LOD-based predicting transform, or the lifting transform may be used, or a method according to a combination of the RAHT/LOD/Lifting may be used.

Equation 5 below is a basic equation of RAHT, and represents a process of transforming x-axis adjacent coefficients of level 1 into coefficients of level 1-1 using the transform function T.

$$\begin{bmatrix} g_{l-1,x,y,z} \\ h_{l-1,x,y,z} \end{bmatrix} = T_{w_1 w_2} \begin{bmatrix} g_{l,2x,y,z} \\ g_{l,2x+1,y,z} \end{bmatrix},$$ [Equation 5]

where $w_1 = w_{l,2x,y,z}$ and $w_2 = w_{l,2x+1,y,z}$ and $$T_{w_1 w_2} = \frac{1}{\sqrt{w_1 + w_2}} \begin{bmatrix} \sqrt{w_1} & \sqrt{w_2} \\ -\sqrt{w_2} & \sqrt{w_1} \end{bmatrix}$$

In Equation 5, the coefficient of the transform function T denotes the number of leaf nodes used to generate g_l. A a leaf node level indicates the occupancy of each node. Since the weight function is configured based on the geometry occupancy information, the attribute is encoded at the transmitting side after the geometry is encoded, and is decoded at the receiving side after the geometry is decoded. This may cause a delay in a system requiring high-speed processing. In addition, the complexity of the computation may increase due to floating-point operation (such as division by a square root) in the computation process.

In the case of LOD-based predicting transform and lifting transform, LODs are generated according to the distance of the points and attributes are sequentially encoded. In this case, a process of finding neighboring points must be performed first. In the case of LOD-based predicting transform and lifting transform, a neighbor is defined as a set of nodes sampled with different reference distances from attribute information of an occupied leaf node. Referring to FIG. 9 as an example, LOD0 is a set of nodes having a longer inter-node distance than LOD1. That is, LOD0 is a set composed of points having the greatest distance between points. In predicting a specific node (e.g., P3) belonging to LOD1, neighbor nodes (e.g., P2, P4) among the nodes of LOD0 are used for prediction of node P3. Therefore, in order to predict each attribute, the process of estimating the LOD and the process of finding the neighbor nodes must be performed first. However, these processes have high complexity and take a long execution time. This may be a cause of a delay in a system requiring high-speed processing.

Accordingly, the present disclosure proposes a device and method for improving attribute prediction performance by using similarity between structurally adjacent attributes on a geometry for attribute prediction.

The present disclosure proposes a device and method for improving attribute prediction performance by searching for neighbor nodes based on an octree structure and using the same for attribute prediction. That is, similarity between attributes with high relevance in the geometric structure for a predicted attribute may be effectively removed. In particular, compared to the case where attributes are compressed using RAHT transform, LOD-based predicting transform, and lifting transform, computational complexity and dependence on geometry decoding may be reduced, thereby increasing decoding speed.

Figure 18:
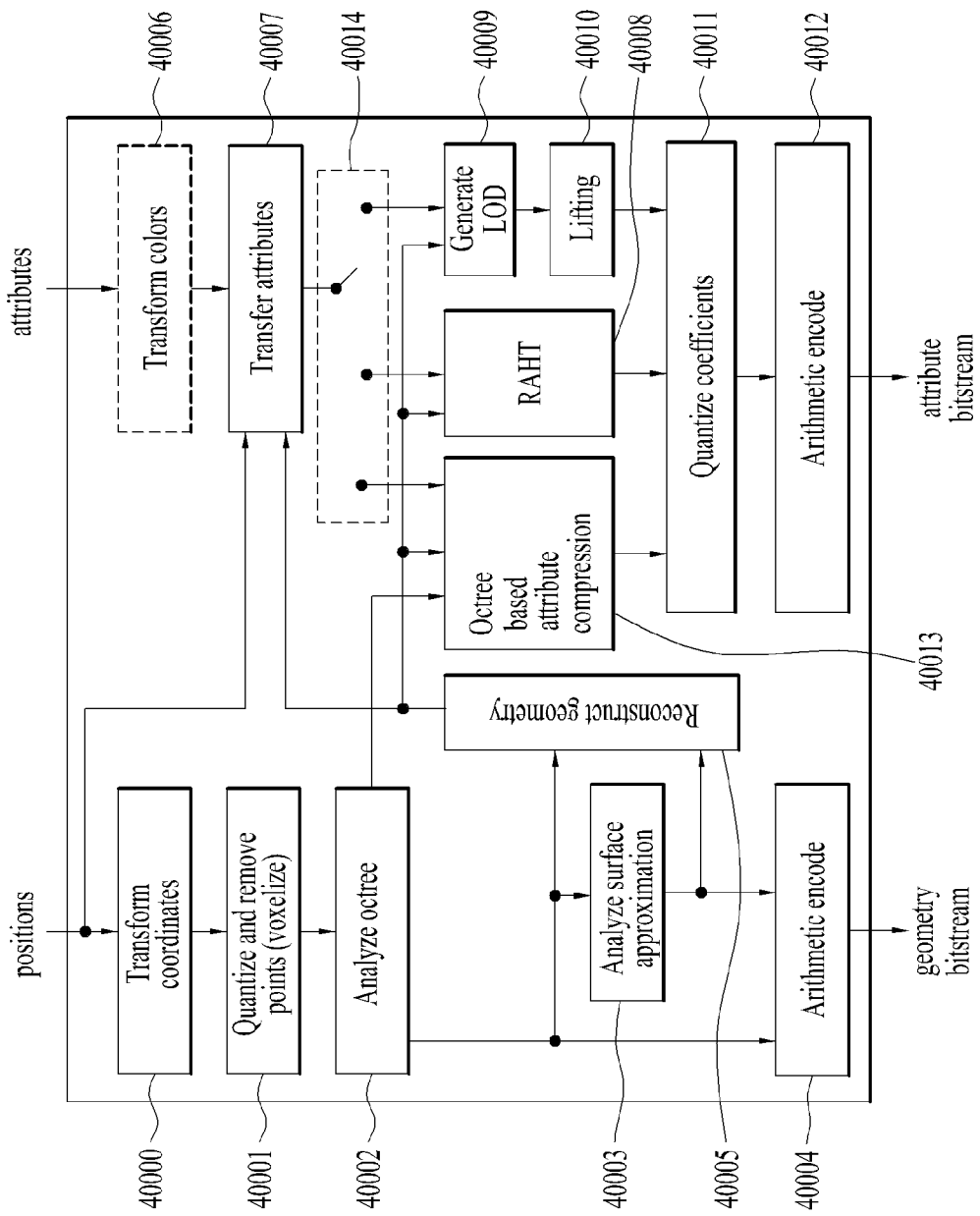
FIG. 18 is a block diagram illustrating another exemplary point cloud video encoder according to embodiments.

FIG. 18 illustrates another embodiment of a point cloud video encoder according to the present disclosure. That is, FIG. 18 shows another embodiment of the point cloud video encoder of FIG. 4. This embodiment further includes an octree-based attribute compressor 40013. The term octree-based attribute compressor 40013 is merely an embodiment used to provide understanding of the present disclosure, and the term may be easily changed by those skilled in the art. Accordingly, the compressor may be referred to by another term within the scope of equivalent meaning.

Each component of the point cloud video encoder of FIG. 18 may be implemented by hardware, software, a processor, and/or a combination thereof.

For parts not described in the description of each block constituting FIG. 18, reference will be made to the descriptions of blocks having the same reference numerals in FIG. 4.

In an embodiment, the point cloud video encoder of FIG. 18 also receives and encodes the point cloud data (or referred to as point cloud video data) acquired by the point cloud video acquisition unit 10001 of FIG. 1. The point cloud data is composed of points, and each point includes geometry (i.e., position) information and attribute information.

According to embodiments, the geometry information may be a coordinate vector of (x, y) of a two-dimensional Cartesian coordinate system, (γ, θ) of a cylindrical coordinate system, or (x, y, z) of a three-dimensional Cartesian coordinate system, (γ, θ, z) of a cylindrical coordinate system, or (γ, θ, φ) of a spherical coordinate system. According to embodiments, the attribute information may be a vector (R, G, B) indicating the color of a point, and/or a brightness value, and/or a reflection coefficient of lidar, and/or a vector of values obtained from one or more sensors, such as a temperature value obtained from a thermal imaging camera.

The point cloud video encoder of FIG. 18 may further include a spatial partitioner (not shown) configured to spatially partition the input point cloud data into at least one 3D block. Here, the 3D block may represent a tile group, a tile, a slice, a coding unit (CU), a prediction unit (PU), or a transform unit (TU). According to an embodiment, the information for spatial partitioning may be entropy-encoded and transmitted to the receiving side. The entropy encoding is a coding scheme of transforming the data to bit-based data for transmission.

Positions of at least one 3D block spatially partitioned by the spatial partitioner according to the embodiments may be output to the coordinate transformation unit 40000, and attribute information (or referred to as attributes) may be output to the color transformation unit 40006.

The coordinate transformation unit 40000 may receive positions and transform the coordinates. That is, the coordinate transformation unit 40000 may transform the existing coordinates into another coordinate system. For example, the positions may be transformed into three-dimensional (XYZ) position information. Alternatively, the coordinate transformation unit 40000 may not perform the coordinate transformation. The output of the coordinate transformation unit 40000 will be referred to as geometry information.

Whether coordinate transformation is performed by the coordinate transformation unit 40000 and the coordinate information may be signaled on a per sequence/frame/tile/slice/block basis, and may be transmitted in a geometry bitstream or a separate bitstream. In addition, in an embodiment, they may be derived by the reception device based on whether the coordinates of a neighboring block is transformed, the size of the block, the number of points, the quantization value, the block partitioning depth, the position of the unit, the distance between the unit and the origin, and the like.

The geometry information output from the coordinate transformation unit 40000 is quantized by the quantization unit 40001. The quantization unit 40001 reconstructs each point of the point cloud data by performing voxelization based on the quantized geometry information. Voxelization refers to a minimum unit for presenting the position information in a 3D space.

In the present disclosure, a three-dimensional cubic space created by dividing a three-dimensional space into units (unit=1.0) based on each axis (x, y, z-axis) in order to store the information on points present in a 3D space is referred to as a voxel. In addition, the process of matching a point present in a 3D space with a specific voxel is referred to as voxelization. The voxel may estimate position information (i.e., spatial coordinates) about at least one point included in the voxel in a positional relationship with a voxel group, and may have attribute information (e.g., color or reflectance information) about the at least one point.

That is, one voxel may include not only one point. For example, when it is assumed that a plurality of points is included in one voxel, a plurality of pieces of point related information may be present in one voxel, or may be integrated into one piece of point information. These adjustments may be performed selectively. In an embodiment, in the case where one piece of point information is present in one voxel (i.e., the latter case in the above example), the position value of the center point of the voxel is set based on the position values of the points present in the voxel.

The octree analysis unit 40002 constructs (or generates) an octree based on voxels output from the quantization unit 40001.

In one embodiment, when the space of the 3D image is partitioned based on the x-axis, y-axis, and z-axis, 8 spaces are created. When each of the 8 spaces is partitioned again based on the x-axis, y-axis, and z-axis, 8 spaces are created from each of the smaller spaces. As described above, the octree has a layer tree structure, in which a parent node, which corresponds to a higher layer, is connected to eight child nodes, which correspond to a lower layer. That is, eight spaces of the same size obtained by spatially dividing a three-dimensional space managed by a parent node into x, y, and z directions, respectively, and are managed by the child nodes.

In this case, nodes belonging to the same layer have the same level value, and child nodes have a level value incremented by 1 from that of the parent node. Every time the child node level is incremented, 8 child nodes are created for each parent node.

A node belonging to the highest layer of the octree is referred to as a root node (or head node), and a node belonging to the lowest layer is referred to as a leaf node.

In the example of FIG. 6, the level value of the highest layer (i.e., the root node) is 1 (i.e., depth 0), and the level value of 8 nodes of the next layer (i.e., the second column) is 2 (i.e., depth 1), and the level value of 16 nodes of the next layer (i.e., the third column) is 3 (i.e., depth 2).

In addition, the partitioning of the octree is performed as much as a destination level value or until the leaf node becomes a voxel. That is, since the voxel reflecting the positions of the points is managed using the octree, the total volume of the octree should be set to (0,0,0) to $(2^d, 2^d, 2^d)$. $2^d$ is set to a value constituting the smallest bounding box surrounding all points of the point cloud video, wherein d is the depth of the octree.

In this case, each node of the octree may be represented with an occupancy code. For example, when a point is included in each node, it is indicated as 1. Where there is no point included, 0 is indicated. Each node has an 8-bit bitmap indicating occupancy for 8 child nodes.

In one embodiment, a node with an occupancy code value of 0 is no longer split into 8 nodes. In FIG. 6, for example, only two nodes having an occupancy code value equal to 1 among the eight nodes of level 2 (i.e., depth 1) are each re-split to generate eight child nodes for each of the nodes. Thereby, unnecessary data may be removed.

The octree generated by the octree analysis unit 40002 is output to the surface approximation analysis unit 40003, the arithmetic encoder 40004, the geometry reconstruction unit 40005, and/or the octree-based attribute compressor 40013.

The surface approximation analysis unit 40003 analyzes and approximates the input octree, and then outputs the result to the arithmetic encoder 40004 and the geometry reconstruction unit 40005.

That is, the geometry information is compressed through the quantization unit 40001, the octree analysis unit 40002, and/or the surface approximation analysis unit 40003.

The arithmetic encoder 40004 entropy-encodes the octree output from the octree analysis unit 40002 or the octree approximated by the surface approximation analysis unit 40003 and outputs a geometry bitstream therefor. More specifically, the arithmetic encoder 40004 entropy-encodes the occupancy code of each node of the leaf node of the octree generated by the octree analysis unit 40002 or the occupancy code of each node of the leaf node of the octree approximated by the surface approximation analysis unit 40003. In this operation, the arithmetic encoder 40004 may directly encode the occupancy code, or may perform intra/inter-coding and then entropy-encode the code to increase compression efficiency. The receiver may reconstruct the octree through the occupancy code.

For the entropy encoding according to the embodiments, various encoding methods such as, for example, Exponential Golomb, Context-Adaptive Variable Length Coding (CAVLC), and Context-Adaptive Binary Arithmetic Coding (CABAC) may be used.

The geometry reconstruction unit 40005 receives the octree generated by the octree analysis unit 40002 and/or the octree approximated by the surface approximation analysis unit 40003 and reconstructs geometry information. That is, the geometry reconstruction unit 40005 reconstructs an octree/voxel based on a result of analysis of the distribution of points.

The geometry information reconstructed by the geometry reconstruction unit 40005 is output to the attribute transformation unit 40007 and/or the RAHT unit 4008 of the attribute encoder and the LOD generation unit 40009.

According to an embodiment of the present disclosure, the octree generated by the octree analysis unit 40002 and/or the octree reconstructed by the geometry reconstruction unit 40005 are output to the octree-based attribute compressor 40013. Details of the octree-based attribute compressor 40013 will be described later.

The color transformation unit 40006 may transform a color in the input attribute information. For example, when the input attribute information includes color information in an RGB format, the unit may transform the color information into a YCbCr format. The color information may or may not be transformed by the color transformation unit 40006. The color transformation by the color transformation unit 40006 according to the embodiments is one of point cloud attribute coding schemes.

The attribute transformation unit 40007 may reconstruct the attribute information by mapping the positions and/or the geometry information reconstructed by the geometry reconstruction unit 40005 to the attribute information output from the color transformation unit 40006. For example, based on the position value of a point included in the voxel, the attribute transformation unit 40007 may transform the value of the attribute of the point at the position. The attribute transformation by the attribute transformation unit 40007 according to the embodiments is one of point cloud attribute coding schemes.

That is, a plurality of points is included in a specific voxel generated by the quantization unit 40001 according to the embodiments, but point information may be integrated and represented by one piece of point information. In addition, a position value of a center point of the voxel may be set based on the position values of the points included in the voxel. In this case, the attribute transformation unit 40007 according to the embodiments performs attribute transformation related thereto. In one embodiment, the attribute transformation unit 40007 may adjust the attribute value of the voxel to the average value of the color or reflectance of points included in the voxel or the average value of the color or reflectance of neighboring points within a specific radius from the position value of the center point of the voxel.

The attribute information reconstructed by the attribute transformation unit 40007 according to the embodiments provided to one of the octree-based attribute compressor 40013, the RAHT transformation unit 40008, and the LOD generation unit 40009 by switching of a switching unit 40014. In the present disclosure, at least one of the octree-based attribute compressor 40013, the RAHT transformation unit 40008, and the LOD generation unit 40009/lifting transformation unit 40010 will be referred to as an attribute compressor. As an example, the attribute compressor may consist of only the octree-based attribute compressor 40013, or may consist of the octree-based attribute compressor 40013 and the RAHT unit 40008 or of the octree-based attribute compressor 40013 and an LOD generation unit 40009/lifting transforming unit 40010. Alternatively, the attribute compressor may be configured to include the octree-based attribute compressor 40013, the RAHT transformation unit 40008, and the LOD generation unit 40009/ lifting transformation unit 40010.

A point cloud attribute coding scheme according to embodiments may use octree-based attribute compression, use RAHT transformation, use LOD generation and lifting transform, or use a combination of the octree-based attribute compression/RAHT/LOD/Lifting.

For details of the RAHT transformation unit 40008, the LOD generation unit 40009, and the lifting transformation unit 40010 according to the embodiments, reference will be made to the description given above with reference to FIG. 4, and description of the details will be skipped.

The coefficient quantization unit 40011 quantizes the attribute information (or attribute data) coded by the octree-based attribute compressor 40013, the RAHT transformation unit 40008, or the LOD generation unit 40009/Lifting transformation unit 40010 based on a coefficient. The arithmetic encoder 40012 entropy-encodes the quantized attribute information and outputs an attribute bitstream therefor. For the entropy encoding, various encoding methods such as, for example, Exponential Golomb, Context-Adaptive Variable Length Coding (CAVLC), and Context-Adaptive Binary Arithmetic Coding (CABAC) may be used.

As described above, one of the methods of compressing attribute information of point cloud data is a method of reducing redundant information between the pieces of attribute information.

The octree-based attribute compressor 40013 according to the embodiments detects neighbor nodes of a node to be encoded based on the octree structure generated by the geometry encoder, and predicts attribute information based on the attribute information about the detected neighbor nodes. Thereafter, it generates and encodes residual attribute information based on the predicted attribute information and the attribute information about the detected neighbor nodes. Thereby, redundant information between the pieces of attribute information may be reduced. In other words, the generated residual attribute information is quantized and then entropy-encoded together with the predicted attribute information and transmitted to the receiving side. The residual attribute information may have the same meaning as the prediction error attribute information.

Figure 19:
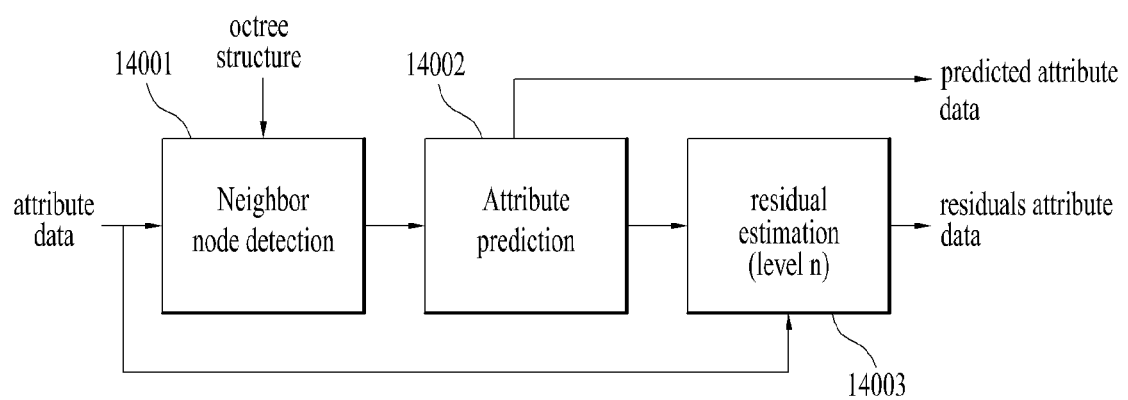
FIG. 19 is a block diagram illustrating an exemplary octree-based attribute compressor according to embodiments.

FIG. 19 is a detailed block diagram of the octree-based attribute compressor 40013 according to embodiments. In an embodiment, the octree-based attribute compressor 40013 may include a neighbor node detection unit 14001, an attribute prediction unit 14002, and a residual attribute estimation unit 14003.

Each component of the octree-based attribute compressor 40013 may be implemented by hardware, software, a processor, and/or a combination thereof.

In an embodiment, the octree-based attribute compressor 40013 may perform attribute prediction based on positional adjacency between sub-nodes divided (or split) from the same node.

That is, the child nodes belonging to the same parent node (or the nodes belonging to the same branch at a higher level) in the octree structure may be viewed as geometrically adjacent nodes. The present disclosure uses geometric adjacency derived from such an octree structure for attribute prediction. That is, in the octree structure, the nodes belonging to the same layer have the same level value, and child nodes have a level value incremented by 1 compared to that of the parent node. Every time the child node level is incremented, 8 child nodes are created for a parent node. Therefore, it may be assumed that the attribute similarity between the 8 child nodes connected to one parent node is the highest.

Figure 20:
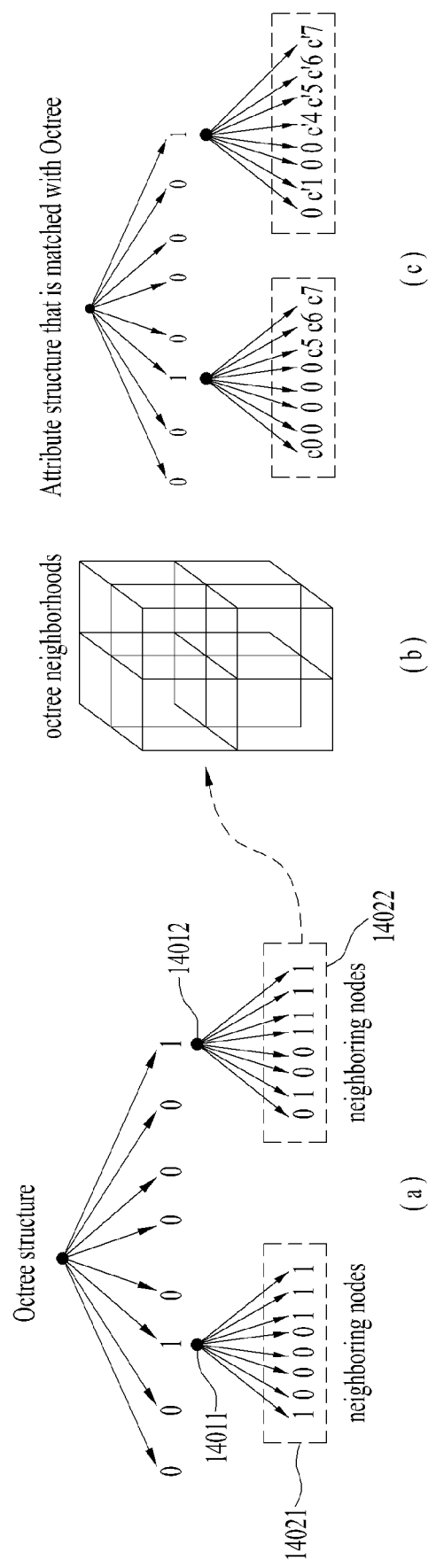
FIGS. 20-(a) to 20-(c) are diagrams illustrating an octree structure and examples of mapping of attribute information to the octree structure according to embodiments.

For example, when the octree structure as shown in FIG. 20-(*a*) is used, it may be assumed that child nodes 14021 split from a parent node 14011 are adjacent to each other, and child nodes 14022 split from a parent node 14012 are adjacent to each other. The child nodes of a lower level split from the same parent node represent 8 nodes adjacent to each other along each axis in the xyz space as shown in FIG. 20-(b).

Each node of the octree is represented with an occupancy code. When a point is included in each node, the node is indicated as 1. Where there is no point included, the node is indicated as 0. A node with an occupancy code set to 1 is referred to as an occupied node. And, a node with an occupancy code set to 0 (i.e., a parent node) is no longer spit into 8 child nodes. In FIG. 20-(a), for example, only two nodes 14011 and 14012 having an occupancy code value equal to 1 among the eight nodes of level 2 (i.e., depth 1) are each re-split and thus each of the nodes generates eight child nodes. A node belonging to the highest layer of the octree is referred to as a root node (or head node), and a node belonging to the lowest layer is referred to as a leaf node. In FIG. 20-(a), it is assumed that the leaf node is in the layer of level 3 (i.e., depth 2).

Therefore, the neighbor node detection unit 14001 of the octree-based attribute compressor 40013 receives the octree structure generated by the octree analysis unit 40002 of the geometry encoder and/or the octree structure reconstructed by the geometry reconstruction unit 40005 as input, and detects neighbor nodes for each node to be attribute-encoded based on the input octree structure.

According to embodiments, for each node of the leaf node, the neighbor node detection unit 14001 may determine 8 nodes including the node among the 8 nodes having the same parent node as neighbor nodes. As another embodiment, for each node of the leaf node, the neighbor node detection unit 14001 may determine the remaining 7 nodes excluding the node from among 8 nodes having the same parent node for each node of the leaf node as neighbor nodes.

FIGS. 20-(a) to 20-(c) illustrate an exemplary case where the range of the neighbor node is configured on a per parent node basis. Therefore, in the case of FIG. 20-(a) as an example, when the node currently searching for a neighbor node is the first node among the child nodes 14021 split from a parent node 14011, the remaining 7 nodes excluding the first node are neighbor nodes of the first nodes. This process is performed for the remaining child nodes split from the parent node 14011 in the same manner. That is, among the eight nodes to be encoded 14021, the remaining seven nodes excluding the target node become neighbor nodes. This process is performed in the same manner for the eight child nodes 14022 split from the parent node 14012. That is, a process of detecting neighbor nodes is performed for each of the nodes of the leaf node. FIG. 20-(b) shows a 2×2×2 block when the size of one side of a neighbor node is 2 as in the above embodiment. In an embodiment, the size information about the neighbor node is signaled using a pred_node_size_log 2_minus1 field and transmitted to the receiving side such that the receiving side can know any change in size of one side of the neighbor node.

In this case, attribute information (c0, c5, c6, c7, c'1, c'4, c'5, c'6, c'7) is mapped to the occupied nodes in the leaf node of the octree, as shown in FIG. 20-(c). That is, the attribute information output from the attribute transformation unit 40007 is mapped to the position information about the occupied nodes in the leaf node of the octree. Here, the mapping between the position information about the occupied nodes of the leaf node and the attribute information may be performed by the neighbor node detection unit 14001 or the attribute prediction unit 14002.

The attribute prediction unit 14002 predicts attribute information about each node based on the attribute information about neighbor nodes detected for each node of the leaf node. That is, the attributes of the point cloud data may be predicted based on the attribute information about the neighbor nodes detected in the octree structure.

Figure 21:
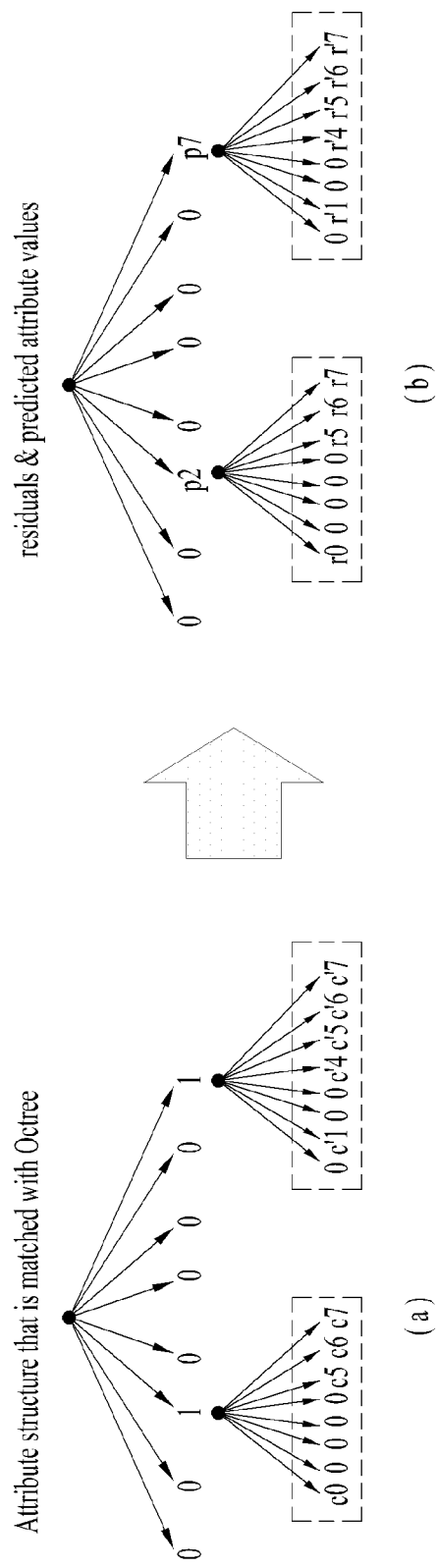
FIGS. 21-(a) and 21-(b) are diagrams illustrating an example of predicting attribute information and estimating residual attributes based on an octree according to embodiments.

In this case, predicted attribute information (or referred to as a predicted attribute value or predicted attribute data) may be estimated for each node, or the same predicted attribute information may be used for the nodes belonging to the neighbor in order to reduce the amount of information. In an embodiment, in FIG. 20, 8 child nodes split from the same parent node are the nodes belonging to the neighbor, and therefore the predicted attribute information about each of the 8 child nodes split from the same parent node may have the same value. In this case, two predicted attributes P2 and P7 are obtained as shown in FIG. 21-(b). In other words, the predicted attribute information about each of the eight nodes 14021 of the leaf node is the same as P2, and the predicted attribute information about each of the eight nodes 14022 is the same as P7. When neighbor nodes are defined to have the same predicted attribute value as in the present embodiment, the number of coefficients required for encoding may be reduced and coding efficiency may be increased.

The attribute information predicted by the attribute prediction unit 14002 may be determined using various types of attribute prediction methods. For example, a representative value of the attributes of neighbor nodes may be determined as predicted attribute information about a node corresponding to the neighbor nodes, or an attribute value representing local characteristics may be determined as the predicted attribute information about the node corresponding to the neighbor nodes. Alternatively, a value that minimizes a prediction error may be calculated/selected and determined as the predicted attribute information about the node corresponding to the neighbor nodes.

Equation 6 below is an embodiment in which the average of the attributes of neighbor nodes is used as predicted attribute information about a node corresponding to the neighbor nodes. In Equation 6, N denotes the number of occupied leaf nodes belonging to a neighbor, and $\lfloor a/b \rfloor$ denotes a quotient obtained when a is divided by b.

$$p(x, y, z) = f_{(x,y,z) \in NEIGHBOR}\{c(x, y, z)\} = \frac{1}{N}\sum_{i,j,k=0}^{1} c(2 \times \lfloor x/2 \rfloor + i, 2 \times \lfloor y/2 \rfloor + j, 2 \times \lfloor z/2 \rfloor + k)$$ [Equation 6]

As another example, a median value of the attributes of the neighbor nodes may be used as predicted attribute information about a node corresponding to the neighbor nodes, or an attribute value of a node at a specific position among the neighbor nodes may used as predicted attribute information about the node corresponding to the neighbor nodes. As another example, a weighted average or the like inversely proportional to the geometric distance and/or attribute similarity may be used as the predicted attribute information. Accordingly, in an embodiment of the present disclosure, the attribute prediction type used by the attribute prediction unit 14002 may be signaled through a pred_type field and transmitted to the receiving side such that the receiving side may recognize the attribute prediction method.

The attribute information predicted by the attribute prediction unit 14002 is output to the coefficient quantization unit 40011 and the residual attribute estimation unit 14003.

The residual attribute estimation unit 14003 estimates the residual attribute information about the leaf node based on the predicted attribute information output from the attribute prediction unit 14002, as shown in FIG. 21-(*b*). In an embodiment, the residual attribute estimation unit 14003 may determine the difference between the attribute information (that is, the original attribute information) about the corresponding node in the leaf node and the predicted attribute information about the node as the residual attribute information (or prediction error attribute information) about the node. This process is performed for each occupied node in the leaf node.

Equation 7 below represents an embodiment of estimation of the residual attribute information. In Equation 7, $r_l(x,y,z)$ is the residual attribute information about occupied node 1 in the leaf node, $c_l(x,y,z)$ is the original attribute information about node 1, and $p_l(x,y,z)$ is the predicted attribute information about node 1.

$$r_l(x,y,z)=g\{c_l(x,y,z),p_l(x,y,z)\}=c_l(x,y,z)-p_l(x,y,z) \quad \text{[Equation 7]}$$

The residual attribute estimation unit 14003 may estimate the difference between the original attribute information and the predicted attribute information by applying various types of methods. For example, various types of methods (e.g., weighted difference, weighted averaged difference, etc.) may be used according to data characteristics, local distribution characteristics, attribute distribution characteristics, implementation methods or purposes. Accordingly, in an embodiment of the present disclosure, the type of residual attribute estimation used by the residual attribute estimation unit 14003 may be signaled through a recon_type field and transmitted to the receiving side such that the receiving side may recognize the residual attribute estimation method.

FIG. 21-(*a*) shows an embodiment of an octree structure in which attribute information (c0, c5, c6, c7, c'1, c'4, c'5, c'6, c'7) is matched to each occupied node of a leaf node in a neighbor node defined on a per parent node basis, and FIG. 21-(*b*) shows an embodiment of an octree structure for predicted error information (P2, P7) and residual attribute information (r0, r5, r6, r7, r'1, r'4, r'5, r'6, r'7) about each of the occupied nodes of the leaf node obtained by applying neighbor node detection, attribute prediction, and residual attribute estimation to FIG. 21-(*a*).

The residual attribute information estimated by the residual attribute estimation unit 14003 is output to the coefficient quantization unit 40011.

The coefficient quantization unit 40011 quantizes the predicted attribute information and the estimated residual attribute information based on the quantization coefficient, and then outputs the same to the arithmetic encoder 40012.

According to an embodiment, the coefficient quantization unit 40011 performs a transformation as shown in Equation 8 below in order to increase efficiency in transmission of the predicted attribute information and residual attribute information (i.e., prediction error attribute information) and then performs the quantization process.

$$d(x,y,z)=T\{r(x,y,z)\} \quad \text{[Equation 8]}$$

In an embodiment, the predicted attribute information and/or the residual attribute information may be transformed based on a transform type such as discrete cosine transform (DCT), discrete sine transform (DST), or wavelet. According to an embodiment of the present disclosure, the transform type used by the coefficient quantization unit 40011 may be signaled through a transform_type field and transmitted to the receiving side such that the receiving side may recognize the transform type. In this case, the transformation of the predicted attribute information and/or the residual attribute information is optional.

That is, the coefficient quantization unit 40011 quantizes the predicted attribute information on which the transformation is performed or on which the transformation is not performed and the estimated residual attribute information based on a quantization coefficient q as in Equation 9 below, and then outputs the same to the arithmetic encoder 40012.

$$d'(x,y,z)=Q\{d(x,y,z)\}=\text{round}[d(x,y,z)/q] \quad \text{[Equation 9]}$$

The degree of quantization by the coefficient quantization unit 40011 is determined by the quantization coefficient q, wherein different quantization coefficients may be used according to data types. In an embodiment, different quantization coefficients may be used according to luma/chroma and predicted attribute information/residual attribute information. According to an embodiment of the present disclosure, quantization information (e.g., quant_step_size_pred, quant_step_size_res, quant_step_chroma_pred, quant_step_chroma_res) used by the coefficient quantization unit 40011 may be signaled and transmitted to the receiving side such that the receiving side may recognize the quantization method.

In an embodiment, the predicted attribute information and residual attribute information quantized by the coefficient quantization unit 40011 are output to the arithmetic encoder 40012 step by step in consideration of the decoder processing at the receiving side. That is, the quantized predicted attribute information is first delivered to the arithmetic encoder 40012, and then the quantized residual attribute information is delivered to the arithmetic encoder 40012. Thereby, a delay of the decoder at the receiving side may be prevented. Also, within each step, the information may be delivered in ascending order (e.g., Morton code order) along the xyz axes, and a reordering process may be added when necessary.

The arithmetic encoder 40012 entropy-encodes the quantized predicted attribute information, entropy-quantizes the quantized residual attribute information and outputs the same in an attribute bitstream. For the entropy encoding, various encoding methods such as exponential Golomb, CAVLC, and CABAC may be used.

According to another embodiment of the present disclosure, when there is one occupied node among the 8 child nodes split from the same parent node, that is, when there are no neighbor nodes, attribute information (i.e., color/reflectance value) about the occupied node is output to the arithmetic encoder 40012 so as to be entropy-coded.

The case where the range of neighbor nodes with respect to a specific node to be encoded of a leaf node is eight child nodes having the same parent node has been described as an embodiment.

The range of the neighbor node may vary depending on an application, image characteristics, and the like. For example, the range of neighbor nodes may be extended to a grandparent node. That is, the range may be extended to 16 child nodes split from 2 parent nodes (e.g., a bundle of two adjacent parent nodes). In this case, in an embodiment, among the 16 nodes split from the two parents, the remaining 15 nodes excluding each node of the leaf node may be determined as neighboring nodes.

In this case, predicted attribute information is determined based on attribute information about 15 neighbor nodes, and residual attribute information is obtained based on the determined predicted attribute information. Therefore, prediction and compression performance differ between a case where the range of neighbor nodes is within a parent node unit and a case where the range is within a grandparent node unit.

Figure 22:
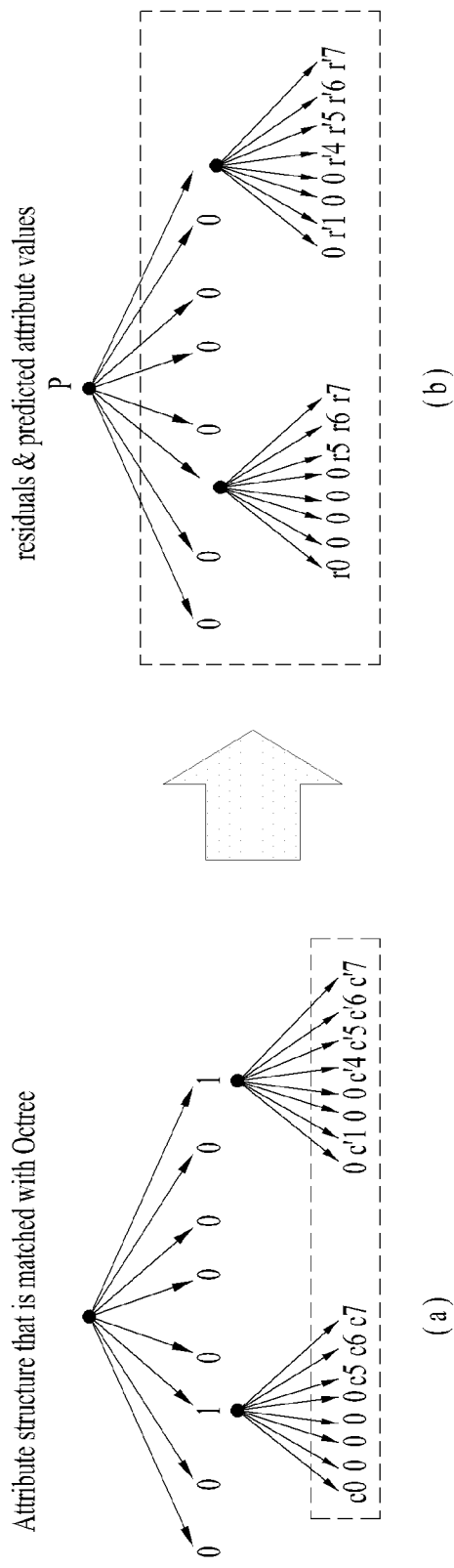
FIGS. 22-(a) and 22-(b) are diagrams illustrating another example of predicting attribute information and estimating residual attributes based on an octree according to embodiments.

FIG. 22-(a) shows an embodiment of an octree structure in attribute information (c0, c5, c6, c7, c'1, c'4, c'5, c'6, c'7) about each occupied node of a leaf node is matched with a neighbor node defined on a grandparent node basis, and FIG. 22-(b) shows an embodiment of an octree structure showing predicted attribute information (p) and residual attribute information (r0, r5, r6, r7, r'1, r'4, r'5, r'6, r'7) about each of the occupied nodes of the leaf node obtained by applying neighbor node detection, attribute prediction, and residual attribute estimation to FIG. 22-(a).

As such, prediction and compression performance of point cloud data may vary depending on the range of neighbor nodes. In addition, as described above, information on the size of the neighbor node varying as described above is signaled through the pred_node_size_log 2_minus1 field and transmitted to the receiving side.

Figure 23:
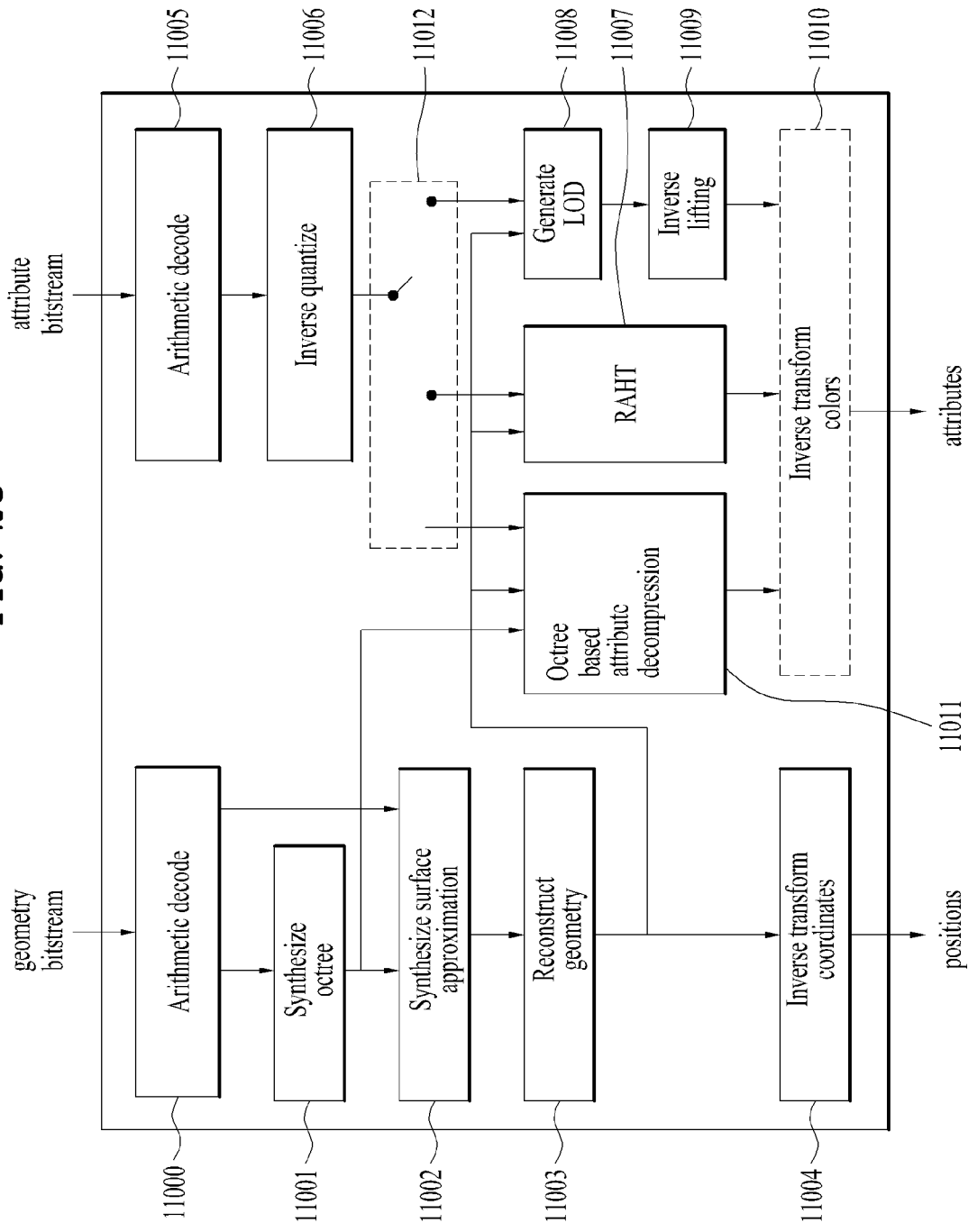
FIG. 23 is a block diagram illustrating another exemplary point cloud video decoder according to embodiments.

FIG. 23 shows another embodiment of a point cloud video decoder according to the present disclosure. That is, FIG. 23 shows another embodiment of the point cloud video decoder of FIG. 11, which further includes an octree-based attribute decompressor 11011. The term octree-based attribute decompressor 11011 is merely an embodiment used to provide understanding of the present disclosure, and may be easily changed by those skilled in the art. Therefore, another term may be used within the scope of equivalent meaning.

Each component of the point cloud video decoder of FIG. 23 may be implemented by hardware, software, a processor, and/or a combination thereof. The point cloud video decoder of FIG. 23 has the same meaning as the point cloud decoder in the present disclosure.

For parts not described in the description of each block constituting FIG. 23, reference will be made to the descriptions of blocks having the same reference numerals in FIG. 11.

The point cloud video decoder of FIG. 23 may perform a reverse process of the operation of the point cloud video encoder of FIG. 18.

The arithmetic decoder 11000, the octree synthesizer 11001, the surface approximation synthesizer 11002, the geometry reconstruction unit 11003, and the coordinate inverse transformer 11004 of the point cloud video decoder 10006 may be collectively referred to as a geometry decoder. The arithmetic decoder 11005, the inverse quantization unit 11006, the octree-based attribute decompressor 11011, the RAHT inverse transformation unit 11007, the LOD generation unit 11008, the inverse lifter 11009, and/or the inverse color transformation unit 11010 may be collectively referred to as an attribute decoder.

The arithmetic decoder 11000 entropy-decodes the geometry bitstream included in the input bitstream based on the arithmetic method to acquire information about the geometry. The information about the geometry includes the occupancy code of each node of the octree of the transmitting side.

According to an embodiment, the octree synthesizer 11001 reconstructs an octree based on the occupancy code of each node acquired from the information about the geometry. The octree reconstructed by the octree synthesizer 11001 is output to the surface approximation synthesizer 11002. Also, the reconstructed octree may be output to the octree-based attribute decompressor 11011.

In an embodiment, the surface approximation synthesizer 11002 synthesizes a surface based on the geometry decoded by the arithmetic decoder 11000 and/or the octree reconstructed by the octree synthesizer 11001.

In an embodiment, the geometry reconstructor 11003 reconstructs the geometry based on the surface synthesized by the surface approximation synthesizer 11002 and/or the geometry decoded by the arithmetic decoder 11000. In this case, when the direct mode is applied, the geometry reconstructor 11003 directly invokes and adds the position information value of the point. When the trisoup mode is applied, the geometry reconstruction unit reconstructs the geometry through the triangle reconstruction, up-sampling, voxelization processes (see section 2.1.3 for details). The reconstructed geometry may include a reconstructed (decoded) point cloud picture/frame without (any) attributes.

The geometry reconstructed by the geometry reconstructor 11003 is output to the coordinate inverse transformer 11004 and the octree-based attribute decompressor 11011 of the attribute decoder. Also, the reconstructed geometry may be output to the RATH inverse transformation unit 11007 and/or the LOD generation unit 11008.

In an embodiment, the coordinate inverse transformer 11004 inversely transforms the coordinates based on the reconstructed geometry to acquire positions.

The arithmetic decoder 11005 of the point cloud video decoder 10006 entropy-decodes the attribute bitstream included in the input bitstream based on the arithmetic method to acquire information about attributes.

According to an embodiment, the inverse quantization unit 11006 inversely quantizes the attribute information acquired by the arithmetic decoder 11005. According to an embodiment, the attribute information includes predicted attribute information and residual attribute information. That is, the inverse quantization unit 11006 performs an inverse quantization process in the attribute decoding process, when necessary.

The attribute information output from the inverse quantization unit 11006 is provided to one of the octree-based attribute decompressor 11011, the RAHT inverse transformation unit 11007, and the LOD generation unit 11008 by the switching of the switching unit 11012. In the present disclosure, at least one of the octree-based attribute decompressor 110011, the RAHT inverse transformation unit 11007, and the LOD generation unit 11008/inverse lifting unit 11009 will be collectively referred to as an attribute decompressor. For example, the attribute decompressor may consist of only the octree-based attribute decompressor 11011, or consist of the octree-based attribute decompressor 11011 and the RAHT inverse transformation unit 11007 or the octree-based attribute decompressor unit 11011 and the LOD generation unit 11008/inverse lifting unit 11009. Alternatively, the attribute decompressor may include the octree-based attribute decompressor 11011, the RAHT inverse transformation unit 11007, and the LOD generation unit 11008/inverse lifting unit 11009.

The point cloud attribute decoding method according to the embodiments may use octree-based attribute decompression, use RAHT inverse transform, use LOD generation and inverse lifting transform, or use a method according to a combination of octree-based attribute decompression/RAHT/LOD/Lifting. That is, the inverse transformation process for octree-based attribute compression/RAHT/LOD/Lifting is selectively performed according to the method applied to encoding.

In an embodiment, the RAHT inverse transformation unit 11007, the LOD generation unit (generate LOD) 11008, and/or the inverse lifting unit (Inverse lifting) 11009 may perform the reverse process of the operation corresponding to the RAHT unit 40008, the LOD generation unit 40009 and/or the lifting transformation unit 40010.

The operation of the octree-based attribute decompressor 11011 will be described later in detail.

The attribute information reconstructed by the attribute decompressor is output to the inverse color transformation unit 11010. In an embodiment, the inverse color transformation unit 11010 performs color transformation on the input attribute information, when necessary.

As described above, the point cloud video decoder includes the geometry decoder and the attribute decoder of FIG. 23, and positions decoded and output by the geometry decoder and point cloud content including attribute information decoded and output by the attribute decoder are output to the renderer 10007.

The rendering process of the renderer 10007 refers to a process of rendering and displaying data of the point cloud content in a 3D space. According to an embodiment, the renderer 10007 renders the data according to a desired rendering method based on the position and attribute information about points decoded through the decoding process of the point cloud video decoder 10006. The points of point cloud content may be rendered into vertices with a certain thickness, a cube having a specific minimum size centered at the vertex position, or a circle centered at the vertex position. The user may view all or part of the rendered result through a VR/AR display or a general display.

In addition, the feedback process may include a process of transmitting various kinds of feedback information that may be acquired in the display process to the transmitting side or to the decoding at the receiving side. Since the feedback process has been described in detail above, reference will be made to the foregoing and a detailed description thereof will be omitted herein to avoid redundant description.

The octree-based attribute decompressor 11011 according to the embodiments performs the reverse operation of the operation of the octree-based attribute compressor 40013 of FIG. 19, and reconstructs the original attribute information based on the residual attribute information and the attribute information predicted based on the signaling information.

Figure 24:
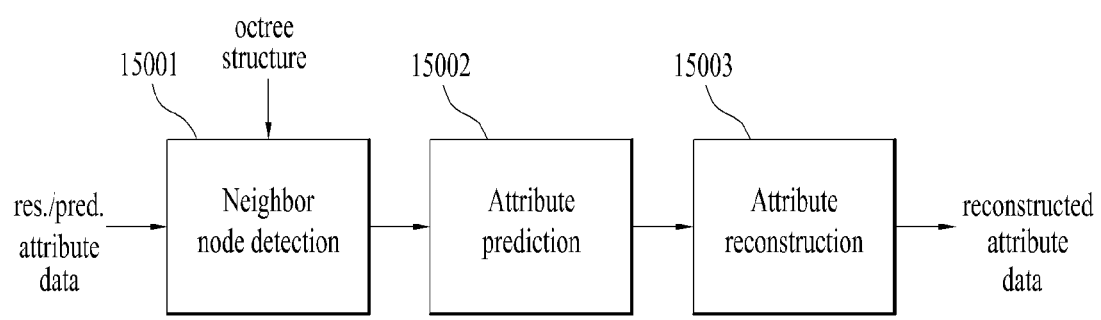
FIG. 24 is a block diagram illustrating an exemplary octree-based attribute decompressor according to embodiments.

FIG. 24 is an exemplary detailed block diagram illustrating the octree-based attribute decompressor 11011 according to embodiments. According to an embodiment, the octree-based attribute decompressor 11011 may include a neighbor node detection unit 15001 configured to detect a neighbor node based on an octree, an attribute prediction unit 15002 configured to predict attributes a node based on the information about the detected neighbor node, an attribute reconstruction unit 15003 configured to reconstruct attribute information based on the predicted attribute information and received residual attribute information.

Each component of the octree-based attribute decompressor 11011 of FIG. 24 may be implemented by hardware, software, a processor, and/or a combination thereof.

The neighbor node detection unit 15001 of the octree-based attribute decompressor 11011 receives an octree structure, predicted attribute information, and residual attribute information. According to an embodiment, the octree structure is provided by the octree synthesis unit 11001 and/or the geometry reconstructor 11003. According to an embodiment, the predicted attribute information and the residual attribute information are provided by the inverse quantization unit 11006.

The inverse quantization unit 11006 may use an inverse function of quantization as shown in Equation 10 below.

$$\hat{d}(x,y,z)=Q^{-1}\{d'(x,y,z)\}=d'(x,y,z)\times q \qquad \text{[Equation 10]}$$

In an embodiment, when the coefficient quantization unit 40011 of the transmitting side uses different quantization coefficients according to various quantization methods or data characteristics, the inverse quantization coefficient q may be included in the received signaling information. The degree of quantization by the coefficient quantization unit 40011 is determined by the quantization coefficient q. In addition, data having different characteristics such as luma/chroma and predicted attribute information/residual attribute information may use different quantization coefficients. In this case, according to an embodiment, the received signaling information may include quantization coefficients (e.g., quant_step_size_pred, quant_step_size_res, quant_step_chroma_pred, quant_step_chroma_res) used by the coefficient quantization unit 40011.

That is, the inverse quantization unit 11006 inversely quantizes the attribute information and/or the residual attribute information predicted based on the quantization information included in the signaling information.

In addition, in the case where the transmitting side has performed transformation on the predicted attribute information and/or residual attribute information, inverse transformation is performed as in Equation 11 below based on the value of the transform_type field included in the signaling information. That is, the predicted attribute information and/or residual attribute information are inversely transformed based on a transform type such as DCT, DST, or wavelet according to the value of the transform_type field.

$$\hat{r}(x,y,z)=T^{-1}\{\hat{d}(x,y,z)\} \qquad \text{[Equation 11]}$$

The predicted attribute information and residual attribute information output from the inverse quantization unit 11006 are output to the neighbor node detection unit 15001 of the octree-based attribute decompressor 11011. The neighbor node detection unit 15001 performs the same process as the neighbor node detection unit 14001 of the transmitting side to reconstruct the position information. That is, the neighbor node detection unit 15001 detects the neighbor nodes of each node of the leaf node based on the octree structure provided by the octree synthesis unit 11001 and/or the geometry reconstruction unit 11003.

In the present disclosure, a case where the range of neighbor nodes is based on a parent node will be described as an embodiment. That is, 8 child nodes having the same parent are defined as neighbor nodes. If a different definition (e.g., different size) is used for the range (or unit) of neighbor nodes, the size for detecting neighbor nodes may be estimated based on the value of the pred_node_size_log 2_minus field included in the received signaling information.

The neighbor node detection unit 15001 determines the remaining 7 nodes excluding each node of the leaf node in the octree structure from among the 8 nodes having the same parent node as neighbor nodes. This process is also performed for the remaining child nodes split from the same parent node. That is, for 8 nodes to be decoded, the remaining 7 nodes excluding a specific node become neighbor nodes. This process is performed for the 8 child nodes split from the same parent node in the same manner. That is, a process of detecting neighbor nodes is performed for all nodes of the leaf node.

In this case, the predicted attribute information output from the inverse quantization unit 11006 is mapped to the occupied nodes in the leaf node of the octree.

The attribute prediction unit 15002 delivers the predicted attribute information for a corresponding child node for each neighbor node to the attribute reconstruction unit 15003.

Here the predicted attribute information for each child node may be independently delivered. By using ae representative value of the predicted attribute information in the neighbor nodes as in an embodiment of the present disclosure, the bit rate used for the delivery of the predicted attribute information may be lowered. In addition, the attribute prediction type to be used for attribute reconstruction may be known from the value of the pred_type field included in the received signaling information.

The attribute reconstruction unit 15003 performs a reverse process of the method of generating residual attribute information (or called prediction error attribute information) used at the transmitting side in order to reconstruct the attributes of each child node based on the predicted attribute information output from the attribute prediction unit 15003 and the residual attribute information (or called prediction error attribute information).

Assuming that the transmitting side of the present disclosure has generated residual attribute information based on the difference between the original attribute information and the predicted attribute information, the attribute reconstruction unit 15003 reconstructs the attribute information by adding the predicted attribute information output from the attribute reconstruction unit 15003 and the residual attribute information, as shown in Equation 12 below.

$$\hat{c}(x,y,z)=g^{-1}\{\hat{r}(x,y,z),\hat{p}(x,y,z)\}=\hat{p}(x,y,z)+\hat{r}(x,y,z) \quad \text{[Equation 12]}$$

In addition, since the type of residual attribute estimation used at the transmitting side may be known from the value of the recon_type field included in the received signaling information, the attribute prediction type to be used for attribute reconstruction may be known.

Figure 25:
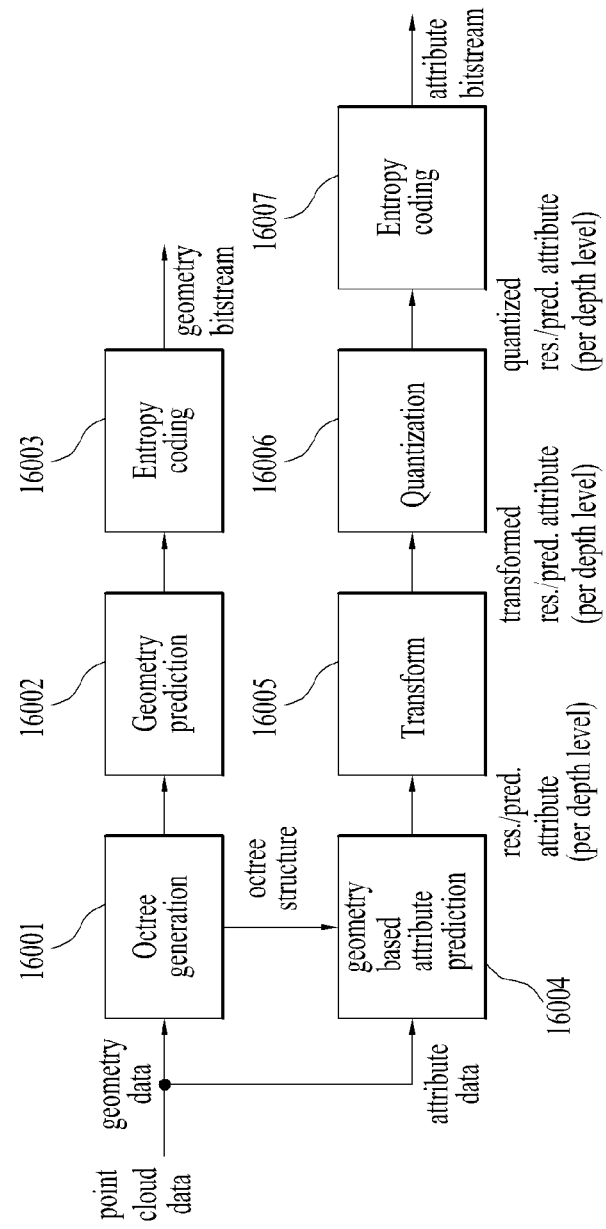
FIG. 25 is a flowchart illustrating an example of a point cloud video encoding method according to embodiments.

FIG. 25 is a flowchart illustrating octree-based attribute encoding according to an embodiment of the present disclosure.

Specifically, an octree structure is generated using geometry information (e.g., position information such as XYZ coordinates or phi-theta coordinates) among the point cloud data (step 16001). Geometry information is predicted based on the octree structure generated in step 16001 (step 16002) and entropy-encoded to transmit a geometry bitstream (step 16003).

Also, attribute information (e.g., color, reflectance, intensity, grayscale, opacity, medium, material, glossiness, etc.) among the point cloud data and the octree structure generated in step 16001 are provided to step 16004. In Step 16004, neighbor nodes of a node to be encoded are detected based on the octree structure, attribute information about the node is predicted based on attribute information about the detected neighbor nodes, and then residual attribute information is estimated based on the predicted attribute information. The prediction of the attribute information and the estimation of the residual attribute information are performed in order to estimate and remove the similarity between the attributes. To this end, in step 16004, prediction of the attribute information and estimation of the residual attribute information are performed based on spatial distribution characteristics of adjacent data.

The predicted attribute information and the residual attribute information are transformed into a format suitable for transmission or into a domain with high compression efficiency (step 16005), and then quantized based on a quantization coefficient (step 16006). In step 16005, various transformation techniques (e.g., DCT series transform, Lifting transform, etc.) may be used according to data types. Alternatively, the predicted attribute information and the residual attribute information may be directly quantized without transformation. The predicted attribute information and residual attribute information quantized in step 16006 are entropy-encoded to output an attribute bitstream (step 16007).

Figure 26:
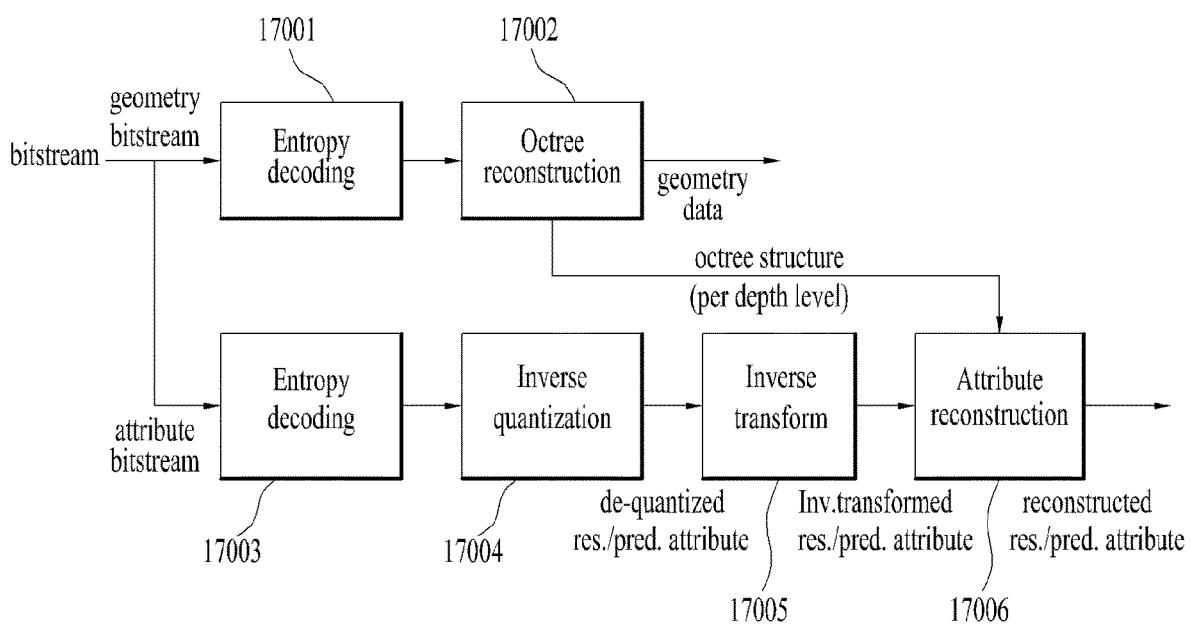
FIG. 26 is a flowchart illustrating an example of a point cloud video decoding method according to embodiments.

FIG. 26 is a flowchart illustrating octree-based attribute decoding according to an embodiment of the present disclosure.

After regenerating an octree structure by entropy-decoding a geometry bitstream among the received bitstreams (step 17001), geometry information is reconstructed based on the regenerated octree structure (step 17002).

An attribute bitstream among the received bitstreams is entropy-decoded (step 17003), inversely quantized based on a quantization coefficient (step 17003), and then subjected to inverse transform (step 17004). In this case, various methods may be used for the inverse quantization and inverse transformation processes according to the quantization and transformation processes used at the transmitting side. If the transmitting side has encoded data without a transformation process, step 17004 is skipped. The predicted attribute information and residual attribute information inversely quantized in step 17003 or inversely transformed in step 17004 and the octree structure regenerated in step 17002 are provided to step 17006. Step 17006 performs detecting neighbor nodes of a node to be decoded based on the regenerated octree structure, estimating predicted attribute information based on the detected neighbor nodes, and adding the received residual attribute information to reconstruct attribute information.

When the octree-based attribute prediction method proposed in the present disclosure is used, the following signaling information may be transmitted for decoding.

The signaling information (or signaling) defined below may be signaled and transmitted in a unit of a parameter set (geometry parameter set (GPS), attribute parameter set (APS), video parameter set (VPS), sequence parameter set (SPS), picture parameter set (PPS), tile parameter set (TPS), etc.)), which is information about the video codec level. Also, the information may be signaled and transmitted on the basis of a coding unit of each image, such as slice or tile. Depending on the application, the information may also be defined at the system level such as a file format, dynamic adaptive streaming over HTTP (DASH), and MPEG media transport (MMT), or at the wired interface level such as High Definition Multimedia Interface (HDMI), Display Port, VESA (Video Electronics Standards Association), and CTA.

Point cloud data according to the present disclosure may include SPS, GPS, APS, and TPS including signaling information according to embodiments. The point cloud data may include one or more geometries and/or attributes. The geometry and/or attributes of the point cloud data may be included in units of one or more slices. The geometry may have a structure of a geometry slice header and geometry slice data.

The method/device according to the embodiments may signal related information to add/perform the operations of the embodiments. The signaling information according to the embodiments of the present disclosure may be used at the transmitting side or the receiving side.

FIGS. 27 to 31 illustrate embodiments of a syntax structure for transmitting signaling information and point cloud data according to the present disclosure.

Each abbreviation has the following meaning. Each abbreviation may be referred to by another term within the scope of the equivalent meaning.

SPS: Sequence Parameter Set,
GPS: Geometry Parameter Set,

APS: Attribute Parameter Set,
TPS: Tile Parameter Set,
Geom: Geometry bitstream=geometry slice header+geometry slice data,
Attr: Attrobite bitstream=attribute blick header+attribute brick data.

The method/device according to the embodiments may add signaling information for octree-based attribute prediction to the APS and signal the same.

The method/device according to the embodiments provides a tile or a slice such that the point cloud may be divided into regions and processed.

Accordingly, when the point cloud is divided into slices, the method/device according to the embodiments may signal signaling information for octree-based attribute prediction for each slice.

FIG. 28 shows an exemplary syntax structure of an attribute parameter set (attribute_paramter_set( )) according to embodiments.

The aps_attr_parameter_set_id field indicates an identifier (ID) for identifying attribute parameter set information.

The aps_seq_parameter_set_id field indicates an identifier (ID) for identifying sequence parameter set information.

The attr_coding_type field indicates an attribute coding type used for attribute coding. Attribute prediction related parameters may be signaled according to the attribute coding type. For example, among the value of the attr_coding_type field, 0 may indicate predicting transform, 1 may indicate lifting transform, 2 may indicate RAHT, and 3 may indicate octree-based attribute compression.

In FIG. 27, the pred_node_size_log 2_minus1 field, pred_type field, recon_type field, quant_step_size_pred field, quant_step_size_res field, quant_step_chroma_pred field, quant_step_chroma_res field, and transform_type field carry information signaled when the value of the attr_coding_type field is 3.

The pred_node_size_log 2_minus1 field indicates the unit size at which a neighbor is configured. For example, when a neighbor is defined on a per parent node basis, the pred_node_size_log 2_minus1 field may be defined to have a value of zero (0). When the unit in which a neighbor is configured is changed, the size(s) of a neighbor node that defines a prediction range for attribute prediction is defined as in Equation 13 below.

$$s = 2^{pred\_node\_size\_log2\_minus1 + 1} \quad \text{[Equation 13]}$$

The pred_type field indicates a prediction type of a method used for attribute prediction of a corresponding node based on the attribute information mapped to the detected neighbor nodes. For example, a prediction method used by a pre-agreement such as average, median filter, weighted mean, attribute, rate-distortion optimization (RDO) based estimation, or node sampling, may be signaled. For example, when the value of the pred_type field indicates average, attribute prediction may be performed as in Equation 14 below. In Equation 14, (x, y, z) denotes a geometric position, p denotes a predicted attribute value, c denotes the original attribute value, N denotes the number of nodes used in the operation, and $\lfloor a/b \rfloor$ denotes a quotient obtained by dividing a by b.

$$p(x, y, z) = f_{(x,y,z) \in NEIGHBOR}\{c(x, y, z)\} = \quad \text{[Equation 14]}$$
$$\frac{1}{N} \sum_{i,j,k=0}^{s-1} c(s \times \lfloor x/s \rfloor + i, s \times \lfloor y/s \rfloor + j, s \times \lfloor z/s \rfloor + k)$$

The recon_type field indicates a method used to estimate residual attribute information based on the predicted attribute information. As an example, a method such as subtraction or weighed subtraction may be used. A method actually used for the operation may be signaled.

The quant_step_size_pred field, quant_step_size_residual field, quant_step_chroma_pred field, and quant_step_chroma_residual field indicate a quantization coefficient (q) used for quantization according to a data type and/or data characteristics such as predicted attribute information, residual attribute information, and luma/chroma.

The transform_type field indicates a transformation method used to transmit the predicted attribute information and the residual attribute information (i.e., prediction error attribute information). As an example, a transformation method such as DCT, DST, or wavelet may be used.

Accordingly, the inverse quantization unit 11006 of the receiving side performs inverse quantization on the residual attribute information and/or the attribute information predicted based on the quant_step_size_pred field, quant_step_size_residual field, quant_step_chroma_pred field, and quant_step_chroma_residual, perform transform on the inversely quantized predicted attribute information and/or residual attribute information based on the transformation method signaled in the transform_type field.

Also, when detecting neighbor nodes based on the octree structure, predicting attribute information based on the detected neighbor nodes, and then reconstructing attribute information based on the predicted attribute information and the received residual attribute information, the octree-based attribute decompressor 11011 of the receiving side references the pred_node_size_log 2_minus1 field, pred_type field, and recon_type field.

The attribute parameter set (attribute_paramter_set( )) of FIG. 27 further includes an aps_extension_present_flag field. When the value of the aps_extension_present_flag field is 1, it indicates that the aps_extension_data syntax structure is present in the APS RBSP syntax structure. When the value of the aps_extension_present_flag field is 0, it indicates that the aforementioned syntax structure is not present.

FIG. 28 shows an exemplary syntax structure of a general attribute bitstream (general_attribute_bitstream( )) according to embodiments.

FIG. 28 shows an embodiment of a syntax structure of a general attribute bitstream for transmitting attribute information encoded based on an octree by a point cloud video encoder (see FIG. 4 or 18) on a slice-by-slice basis according to the present disclosure.

The general attribute bitstream (general_attribute_bitstream( )) includes attribute_slice_header( )) and attribute_slice_data( ).

FIG. 29 shows an embodiment of the syntax structure of attribute_slice_header( ) of FIG. 28.

attribute_slice_header( ) of FIG. 29 includes an abh_attr_parameter_set_id field, an abh_attr_sps_attr_idx field, and byte_alignment( ).

The abh_attr_parameter_set_id field specifies an indicator for an APS including information related to an attribute bitstream.

The abh_attr_sps_attr_idx field specifies an index for indicating an attribute dimension. For example, when the value of the abh_attr_sps_attr_idx field is 0, reflectance may be indicated, and the attribute dimension may indicate 1. As another example, when the value of the abh_attr_sps_attr_idx field is 1, color may be indicated and the attribute dimension may indicate 3.

FIG. 30 shows an embodiment of a syntax structure of attribute_slice_data( ) of FIG. 28.

The dimension field indicates the dimension of the attribute based on the value of the abh_attr_sps_attr_idx field in the attribute slice header.

Also, attribute_slice_data( ) includes a bitstream descriptor for transmitting attribute information compressed according to the value of the attr_coding_type field, which indicates an attribute coding type.

As an example, when the value of the attr_coding_type field is 0, which indicates predicting transform, a PredictingWeight_Lifting_bitstream (dimension) descriptor is included. When the value of the field is 1, which indicates lifting transform, a RAHT_bitstream (dimension) descriptor is included. When the value of the field is 3, which indicates RAHT, a FixedWeight_Lifting_bitstream (dimension) descriptor is included. When the value of the attr_coding_type field indicates octree-based attribute compression, a GeometricAttributeCoding_bitstream (dimension) descriptor for transmitting octree-based predicted attribute information and residual attribute information is included.

FIG. 31 shows an embodiment of a syntax structure of theGeometricAttributeCoding_bitstream (dimension) descriptor of FIG. 30.

The GeometricAttributeCoding_bitstream (dimension) descriptor includes a value_res [k] [i] field iterated as many times as the value of the dimension field in an iterative loop that is iterated as many times as the value of the pointCount field.

The value_res field indicates residual attribute information (also referred to as prediction error attribute information or prediction error attribute value). In an embodiment, after the attribute information is estimated by the octree-based attribute compressor 40013 may be transformed and quantized by the coefficient quantization unit 40008, and entropy-encoded by the arithmetic encoder 40012, it may be transmitted through the value_res field.

The GeometricAttributeCoding_bitstream (dimension) descriptor includes a value_pred[k] [i] field iterated as many times as the value of the dimension field in an iterative loop that is iterated as many times as the value of the pointCount field.

The value_pred field indicates predicted attribute information. In an embodiment, the attribute information predicted by the octree-based attribute compressor 40013 may be transformed and quantized by the coefficient quantization unit 40008, and entropy-encoded by the arithmetic encoder 40012, and then transmitted through the value_pred field.

Each part, module, or unit described above may be a software, processor, or hardware part that executes successive procedures stored in a memory (or storage unit). Each of the steps described in the above embodiments may be performed by a processor, software, or hardware parts. Each module/block/unit described in the above embodiments may operate as a processor, software, or hardware. In addition, the methods presented by the embodiments may be executed as code. This code may be written on a processor readable storage medium and thus read by a processor provided by an apparatus.

In the specification, when a part "comprises" or "includes" an element, it means that the part further comprises or includes another element unless otherwise mentioned. Also, the term " . . . module(or unit)" disclosed in the specification means a unit for processing at least one function or operation, and may be implemented by hardware, software or combination of hardware and software.

Although embodiments have been explained with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may fall within the scope of the appended claims and their equivalents.

The apparatuses and methods may not be limited by the configurations and methods of the embodiments described above. The embodiments described above may be configured by being selectively combined with one another entirely or in part to enable various modifications.

Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the apparatuses of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the apparatus according to the embodiments may include one or more processors capable of executing one or more programs. The one or more programs may perform any one or more of the operations/methods according to the embodiments or include instructions for performing the same. Executable instructions for performing the method/operations of the apparatus according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." "A, B, C" may also mean "at least one of A, B, and/or C."

Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Various elements of the embodiments may be implemented by hardware, software, firmware, or a combination thereof. Various elements in the embodiments may be executed by a single chip such as a single hardware circuit. According to embodiments, the element may be selectively executed by separate chips, respectively. According to embodiments, at least one of the elements of the embodiments may be executed in one or more processors including instructions for performing operations according to the embodiments.

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components.

As used herein, conditional expressions such as "if" and "when" are not limited to an optional case and are intended to be interpreted, when a specific condition is satisfied, to perform the related operation or interpret the related definition according to the specific condition.

MODE FOR INVENTION

As described above, related contents have been described in the best mode for carrying out the embodiments.

INDUSTRIAL APPLICABILITY

As described above, the embodiments may be fully or partially applied to the point cloud data transmission/reception device and system. It will be apparent to those skilled in the art that variously changes or modifications can be made to the embodiments within the scope of the embodiments. Thus, it is intended that the embodiments cover the modifications and variations of this disclosure provided they come within the scope of the appended claims and their equivalents.

The invention claimed is:

1. A method for transmitting point cloud data by an apparatus, the method comprising:
    acquiring the point cloud data including geometry information and attribute information, wherein the geometry information represents positions of points of the point cloud data and the attribute information represents attributes of the points of the point cloud data;
    encoding the geometry information included in the point cloud data;
    encoding the attribute information included in the point cloud data; and
    transmitting the encoded geometry information, the encoded attribute information, and signaling information,
    wherein the encoding the geometry information comprises:
    generating an octree by recursively subdividing a bounding box for the point cloud data, and
    entropy encoding the geometry information based on the octree,
    wherein the encoding the attribute information comprises:
    selecting predicted attribute information of a node to be attribute-encoded based on the octree and an attribute coding method, wherein, when a parent node of the node to be attribute-encoded in the octree includes occupied child nodes, attribute information mapped to one child node of the occupied child nodes is selected for the predicted attribute information,
    acquiring residual attribute information based on the attribute information of the node to be attribute-encoded and the predicted attribute information,
    quantizing the residual attribute information, and
    entropy-encoding the quantized residual attribute information,
    wherein the signaling information includes information for indicating a type of the attribute coding method and information related to the quantization.

2. The method of claim 1, wherein the encoding of the geometry information comprises:
    quantizing the geometry information;
    generating the octree having an octal tree structure based on the quantized geometry information, wherein the octree includes at least a root node corresponding to a highest layer and a leaf node corresponding to a lowest layer;
    approximating a structure of the octree;
    reconstructing geometry information based on the generated octree and the approximated octree; and
    entropy-encoding an occupancy code of each node of the generated octree or the approximated octree and outputting a geometry bitstream.

3. An apparatus for transmitting point cloud data, the apparatus comprising:
    an acquirer configured to acquire the point cloud data including geometry information and attribute information, wherein the geometry information represents positions of points of the point cloud data and the attribute information represents attributes of the points of the point cloud data;
    a geometry encoder configured to encode the geometry information included in the point cloud data;
    an attribute encoder configured to encode the attribute information included in the point cloud data; and
    a transmitter configured to transmit the encoded geometry information, the encoded attribute information, and signaling information,
    wherein the geometry encoder comprises:
    an octree generator configured to generate an octree by recursively subdividing a bounding box for the point cloud data, and
    a first arithmetic encoder configured to entropy encode the geometry information based on the octree,
    wherein the attribute encoder comprises:
    an attribute predictor configured to select predicted attribute information of a node to be attribute-encoded based on the octree and an attribute coding method, wherein, when a parent node of the node to be attribute-encoded in the octree includes occupied child nodes, attribute information mapped to one child node of the occupied child nodes is selected for the predicted attribute information, a residual attribute estimator configured to acquire residual attribute information based on the attribute information of the node to be attribute-encoded and the predicted attribute information, a quantizer configured to quantize the residual attribute information, and a second arithmetic encoder configured to entropy-encode the quantized residual attribute information, wherein the signaling information includes information for indicating a type of the attribute coding method and information related to the quantization.

4. The apparatus of claim 3, wherein the geometry encoder comprises:

a quantizer configured to quantize the geometry information;

an octree analyzer configured to generate the octree having an octal tree structure based on the quantized geometry information, wherein the octree includes at least a root node corresponding to a highest layer and a leaf node corresponding to a lowest layer;

an approximation analyzer configured to approximate a structure of the octree;

a geometry reconstructor configured to reconstruct geometry information based on the generated octree and the approximated octree; and an arithmetic encoder configured to entropy-encode an occupancy code of each node of the generated octree or the approximated octree and output a geometry bitstream.

5. A method for receiving point cloud data by an apparatus, the method comprising:

receiving the point cloud data and signaling information including encoded geometry information and encoded attribute information, wherein the geometry information represents positions of points of the point cloud data and the attribute information represents attributes of the points of the point cloud data;

decoding the encoded geometry information included in the point cloud data;

decoding the encoded attribute information included in the point cloud data; and processing and rendering the decoded geometry information and the decoded attribute information, wherein the decoding the encoded geometry information comprises:

entropy decoding the encoded geometry information, and generating an octree based on the entropy decoded geometry information, wherein the decoding the encoded attribute information comprises:

entropy decoding residual attribute information in the encoded attribute information, inverse quantizing the entropy-decoded residual attribute information, selecting predicted attribute information of a node to be attribute-decoded based on the octree and an attribute coding method in the signaling information, wherein, when a parent node of the node to be attribute-decoded in the octree includes occupied child nodes, attribute information mapped to one child node of the occupied child nodes is selected for the predicted attribute information, and reconstructing attribute information based on the residual attribute information and the predicted attribute information, wherein the signaling information includes information for indicating a type of the attribute coding method and information related to the inverse quantization.

6. An apparatus for receiving point cloud data, the apparatus comprising:

a receiver configured to receive the point cloud data and signaling information including encoded geometry information and encoded attribute information, wherein the geometry information represents positions of points of the point cloud data and the attribute information represents attributes of the points of the point cloud data;

a geometry decoder configured to decode the encoded geometry information included in the point cloud data;

an attribute decoder configured to decode the encoded attribute information included in the point cloud data; and a renderer configured to process and render the decoded geometry information and the decoded attribute information, wherein the geometry decoder comprises:

a first arithmetic decoder configured to decode the encoded geometry information, and an octree generator configured to generate an octree based on the entropy decoded geometry information, wherein the attribute decoder comprises:

a second arithmetic decoder configured to entropy decode residual attribute information in the encoded attribute information, an inverse quantizer configured to inverse quantize the entropy-decoded residual attribute information, an attribute predictor configured to select predicted attribute information of a node to be attribute-decoded based on the octree and an attribute coding method in the signaling information, wherein, when a parent node of the node to be attribute-decoded in the octree includes occupied child nodes, attribute information mapped to one child node of the occupied child nodes is selected for the predicted attribute information, and an attribute reconstructor configured to reconstruct attribute information based on the residual attribute information and the predicted attribute information, wherein the signaling information includes information for indicating a type of the attribute coding method and information related to the inverse quantization.

* * * * *